(12) United States Patent
Kobayashi et al.

(10) Patent No.: US 7,301,571 B2
(45) Date of Patent: Nov. 27, 2007

(54) METHOD AND IMAGING APPARATUS FOR CORRECTING DEFECTIVE PIXEL OF SOLID-STATE IMAGE SENSOR, AND METHOD FOR CREATING PIXEL INFORMATION

(75) Inventors: Hirokazu Kobayashi, Asaka (JP); Kazuya Oda, Asaka (JP); Takeshi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 727 days.

(21) Appl. No.: 10/757,469

(22) Filed: Jan. 15, 2004

(65) Prior Publication Data

US 2004/0145664 A1    Jul. 29, 2004

(30) Foreign Application Priority Data

Jan. 17, 2003    (JP)    ............................. 2003-009943
Mar. 28, 2003    (JP)    ............................. 2003-091948

(51) Int. Cl.
    *H04N 9/64*    (2006.01)
(52) U.S. Cl. ................................... 348/246
(58) Field of Classification Search ............ 348/216.1, 348/218.124, 246, 247; 382/272, 275
    See application file for complete search history.

(56) References Cited

U.S. PATENT DOCUMENTS

| | | | | |
|---|---|---|---|---|
| 5,327,246 A * | 7/1994 | Suzuki | ........................ | 348/246 |
| 6,028,299 A | 2/2000 | Hirama et al. | | |
| 6,211,915 B1 * | 4/2001 | Harada | ........................ | 348/298 |
| 6,660,988 B2 * | 12/2003 | Lee et al. | ................. | 250/208.1 |
| 6,831,692 B1 * | 12/2004 | Oda | ............................. | 348/241 |
| 7,092,018 B1 * | 8/2006 | Watanabe | .................... | 348/247 |
| 2003/0141564 A1 * | 7/2003 | Kondo et al. | ................ | 257/442 |
| 2005/0030394 A1 * | 2/2005 | Mendis et al. | .............. | 348/246 |

FOREIGN PATENT DOCUMENTS

| | | |
|---|---|---|
| JP | 60-70879 A | 4/1985 |
| JP | 1-29475 B2 | 6/1989 |
| JP | 07-143403 A | 6/1995 |
| JP | 7-274075 A | 10/1995 |
| JP | 9-205589 A | 8/1997 |
| KR | 2003-0005009 A | 1/2003 |
| KR | 2003-0009943 | 2/2003 |

* cited by examiner

*Primary Examiner*—Vivek Srivastava
*Assistant Examiner*—Timothy J Henn
(74) *Attorney, Agent, or Firm*—Birch, Stewart, Kolasch & Birch, LLP

(57) ABSTRACT

In a solid-state image sensor in which a large number of pixel cells each comprised of a combination of a main photosensitive pixel having a relatively large area and a subsidiary photosensitive pixel having a relatively small area are arranged, if the subsidiary photosensitive pixel has a defect for any pixel cell, division photometry data during AE processing is read, and the defective pixel is replaced with a value obtained by dividing the output value of the main photosensitive pixel at the same position by a sensitivity ratio only for a section for which it is determined that the main photosensitive pixel is not saturated. Thus, the pixel value of a defective pixel can be accurately corrected without causing a reduction in resolution sensitivity compared to a conventional method of correcting a defective pixel using surrounding pixel information.

10 Claims, 16 Drawing Sheets

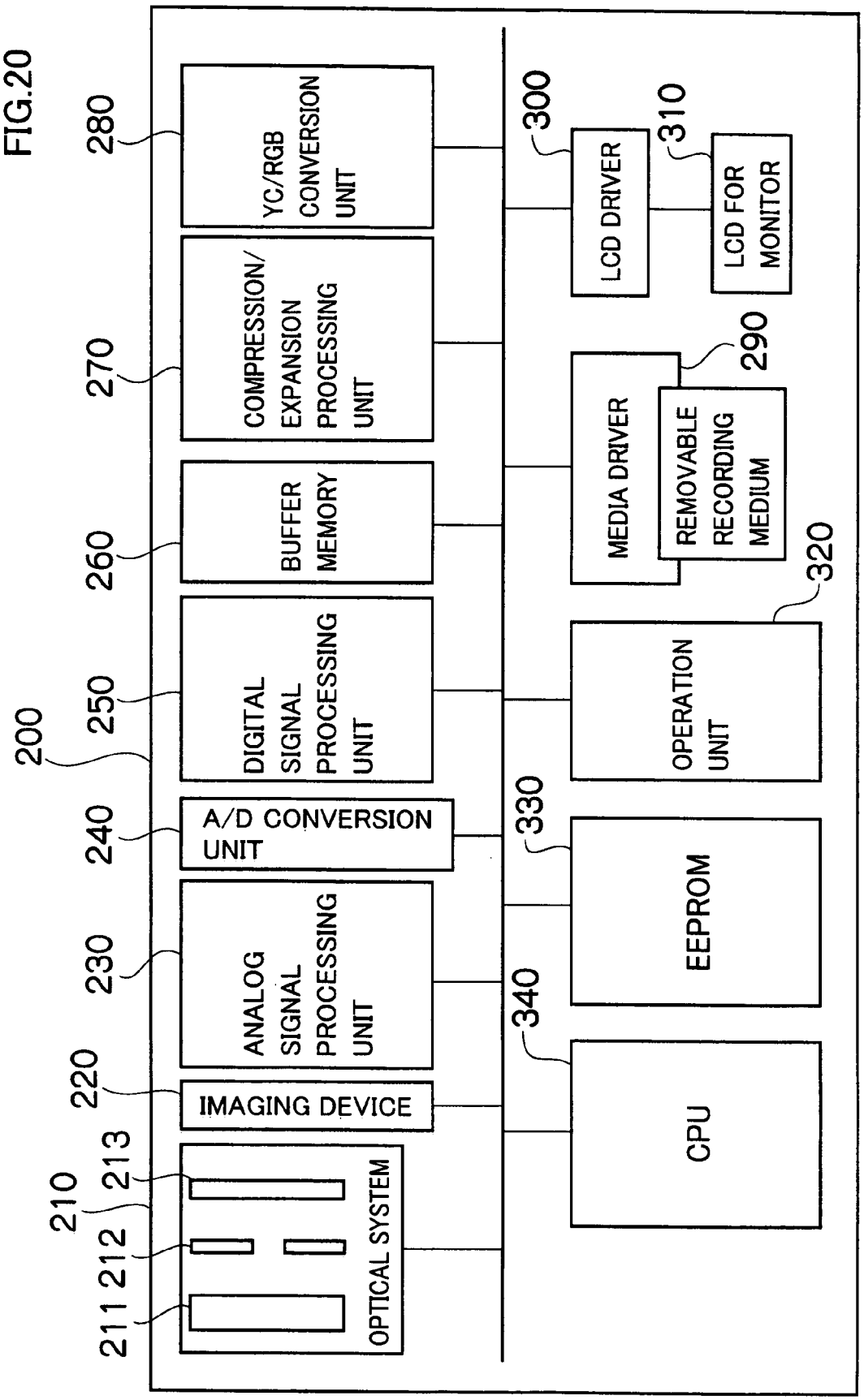

METHOD AND IMAGING APPARATUS FOR CORRECTING DEFECTIVE PIXEL OF SOLID-STATE IMAGE SENSOR, AND METHOD FOR CREATING PIXEL INFORMATION

This Nonprovisional application claims priority under 35 U.S.C. § 119(a) on Patent Application No(s). 2003-009943 and 2003-091948 filed in JAPAN on Jan. 17, 2003 and Mar. 28, 2003, the entire contents of which are hereby incorporated by reference.

BACKGROUND OF THE INVENTION

1. Field of the Invention

The present invention relates to a method and an imaging apparatus for correcting a defective pixel of a solid-state image sensor, and particularly to a technique that is applied to an electronic image recording apparatus such as a digital camera or movie camera, which is a signal processing technique for correcting defects (flaws) in photosensitive pixels that may occur in production of a solid-state image sensor. The present invention further relates to a digital camera which comprises an imaging device having two types of light-receiving elements of different light-receiving sensitivities and light-receiving signal saturation levels for each pixel, and a method for creating pixel information in the imaging device mounted on the digital camera.

2. Description of the Related Art

A solid-state image sensor such as a charge-coupled device (CCD), used in a digital camera or the like has a very small dynamic range compared to a general silver halide photograph, and therefore even an image captured through correct exposure may seem somewhat unsatisfactory compared to a silver halide photograph. Moreover, so called loss of shadow detail and burnt highlight may occur, resulting in significant degradation in image quality depending on image-capturing conditions. For eliminating these disadvantages, a method of capturing a plurality of images of different levels of exposure in the same scene and combining the plurality of image data by computation to obtain an image having an increased dynamic range has been proposed.

Japanese Patent Application Publication No. 9-205589 discloses a CCD solid-state imaging apparatus divides one unit cell into two types of light-receiving areas (high sensitivity area and low sensitivity area) having different sensitivities for a large number of light-receiving portions (unit cells) two-dimensionally arranged on a light-receiving surface, and mixes or adds signals read from the two light-receiving areas, respectively, thereby achieving an increase in dynamic range.

The solid-state image sensor of a CCD or the like is produced by forming a large number of photosensitive elements such as photodiodes on a semiconductor substrate but in production of the image sensor, a defective pixel unable to capture a pixel value on a local basis may occur due to impurities introduced in the semiconductor substrate or the like.

For the image sensor having such a defective pixel, Japanese Patent Application Publication No. 7-143403 discloses a technique of correcting the pixel value of the defective pixel according to combined signals from a plurality of surrounding pixels adjacent to the defective pixel.

An imaging device using a CCD or the like has its light-receiving area formed by integrating many hundred of thousands to millions of very small light-receiving elements, and it is therefore difficult to produce an imaging device having no defective light-receiving element, i.e., defective pixel. Thus, correction processing is carried out such that existence/nonexistence of a defect for each pixel (defect data) of the imaging device is acquired in advance, a data table indicating whether or not each pixel is defective, the data table is recorded in a nonvolatile memory of a digital camera equipped with the corresponding imaging device, and the digital camera replaces a signal of each defective pixel with a signal of an adjacent normal pixel with reference to the data table recorded in the nonvolatile memory when an imaging signal is processed (see Japanese Patent Publication No. 1-29475, for example).

In a method for correcting flaws of a solid-state image sensor, which has been conventionally practiced, correction is carried out such that a photosensitive pixel exhibiting an irregular behavior equal to or greater than a defined level in a production process is detected as a flaw, and if the number of flaws is equal to or less than a defined number, signals outputted from photosensitive pixels determined as flaws are constantly replaced with surrounding pixel information, or an average value of several surrounding pixels is constantly outputted.

According to this conventional correction method, if a considerable number of photosensitive pixels are determined as flaws, and signals outputted from these flaws are corrected with the values of surrounding pixels, resulting image data would be as if filtered by a lowpass filter (LPF) on a local basis even before image signal processing.

A wide dynamic range imaging device having two types of light-receiving elements of different light-receiving sensitivities and light-receiving signal saturation levels for each pixel has essentially an increased number of light-receiving elements. In this case, if a data table created for each of accumulated charges of light-receiving elements associated with low luminance (standard signals), accumulated charges of light-receiving elements associated with high luminance (high luminance signals) and mixed outputs of standard signals and high luminance signals is recorded in a nonvolatile memory, the nonvolatile memory requires having a large recording capacity, and correction processing is complicated.

SUMMARY OF THE INVENTION

The present invention has been made in view of these situations, an object thereof is to provide a method for correcting a defective pixel and an imaging apparatus capable of accurately correcting the pixel value of the defective pixel without causing a reduction in resolution sensitivity, and a further object thereof is to provide a digital camera having a function of efficiently correcting an imaging device of a type having two types of light-receiving elements of different light-receiving sensitivities and light-receiving signal saturation levels for each pixel, using a small amount of information relative to the number of light-receiving elements, and a method for creating image information for use in the digital camera.

In order to attain the above-described object, the present invention is directed to a method for correcting a defective pixel of a solid-state image sensor having a structure in which a large number of pixel cells each comprised of a combination of a main photosensitive pixel having a relatively large area and a subsidiary photosensitive pixel having a relatively small area are arranged according to a predetermined arrangement form, and a signal according to a signal charge photoelectrically converted with the main photosensitive pixel and a signal according to a signal charge photoelectrically converted with the subsidiary photosensitive pixel are selectively fetched, the method comprising the steps of: if for any cell of the solid-state image sensor, the main photosensitive pixel constituting the pixel cell is a normal pixel, and the subsidiary photosensitive pixel is a defective pixel, then determining whether or not the level of a signal obtained from a main photosensitive pixel of a pixel cell existing around the pixel cell including the defective subsidiary photosensitive pixel is lower than a predetermined saturation level indicating a saturated output; and if the level of the signal obtained from the main photosensitive pixel of the pixel cell existing around the pixel cell including the defective pixel is lower than the saturation level, then correcting the pixel value of the defective subsidiary photosensitive pixel according to the pixel value of the main photosensitive pixel in the pixel cell identical to that of the defective photosensitive pixel.

According to the present invention, information of the optically same phase can be acquired for the main photosensitive pixel and the subsidiary photosensitive pixel, and the main photosensitive pixel and the subsidiary photosensitive pixel in the same pixel cell can be handled on the premise that they are situated at almost same positions. If the subsidiary photosensitive pixel is defective in one pixel cell, and a normal signal cannot be fetched from the subsidiary photosensitive pixel, the pixel value of the defective subsidiary photosensitive pixel is corrected using an output value (pixel value) of the normal main photosensitive pixel in the pixel cell. However, this correction is carried out only if the level of a signal obtained from a main photosensitive pixel (normal pixel) of a pixel cell existing around the defective pixel is lower than a saturation level.

If the level of the signal obtained from the main photosensitive pixel of the pixel cell existing around the defective pixel is equal to the saturation level, i.e., for a high luminance area in which the pixel value of the main photosensitive pixel is saturated, conventional (lowpass filter-type) correction is preferably carried out because correction of the defect of the subsidiary photosensitive pixel with the pixel value of the main photosensitive pixel in the same pixel cell is inappropriate.

Conversely, if the level of the signal obtained from the main photosensitive pixel of the pixel cell existing around the defective pixel is lower than the saturation level, i.e., the dynamic range of the main photosensitive pixel is not exceeded, the defect of the subsidiary photosensitive pixel is corrected with the pixel value of the main photosensitive pixel in one pixel cell because there is a certain correlation (e.g., proportionality) between the incident light amount and the pixel value. Consequently, a lowpass filter effect is reduced compared to conventional correction, and resolution sensitivity can be maintained after correction.

According to one aspect of the present invention, the pixel value of the defective subsidiary photosensitive value is determined by dividing the pixel value of the main photosensitive pixel in the pixel cell identical to that of the defective subsidiary photosensitive pixel by a ratio of the sensitivity of the main photosensitive pixel to the sensitivity of the subsidiary photosensitive pixel.

According to another aspect of the present invention, if for any pixel cell of the solid-state image sensor, the main photosensitive pixel constituting the pixel cell is a defective pixel, then the pixel value of the defective main photosensitive pixel is corrected according to the pixel value of a main photosensitive pixel of a pixel cell existing around the pixel cell including the defective main photosensitive pixel.

There is an aspect in which conventional correction is carried out indiscriminately for the defect of the main photosensitive pixel, while the above correction using the pixel value of the main photosensitive pixel in the same pixel cell is carried out for the defect of the subsidiary photosensitive pixel.

Another aspect of the present invention is characterized in that for any pixel cell of the solid-state image sensor, if the main photosensitive pixel constituting the pixel cell is a defective pixel, and the subsidiary photosensitive pixel is a normal pixel, then the pixel value of the defective main photosensitive pixel is corrected according to the pixel value of the subsidiary photosensitive pixel in the pixel cell identical to that of the defective main photosensitive pixel if the level of a signal obtained from a main photosensitive pixel of a pixel cell existing around the pixel cell including the defective main photosensitive pixel exceeds a predetermined criterion.

If the defect of the main photosensitive pixel is corrected using the pixel value of the subsidiary photosensitive pixel in the same pixel cell on every occasion, S/N may be deteriorated due to a large gain, and therefore conventional correction is preferably carried out for a low luminance area where S/N may be further deteriorated due to gamma conversion or the like. A criterion value for determining whether or not it is a low luminance portion where S/N may be deteriorated is defined in advance, and if the criterion value is exceeded, the pixel value of the defective main photosensitive pixel using the pixel value of the subsidiary photosensitive pixel in the same pixel cell.

There is an aspect in which when the defect of the main photosensitive pixel is corrected, computation of multiplying the pixel value of the subsidiary photosensitive pixel in the pixel cell identical to that of the defective main photosensitive pixel by a ratio of the sensitivity of the main photosensitive pixel to the sensitivity of the subsidiary photosensitive pixel, whereby the pixel value of the defective main photosensitive pixel is determined.

In order to attain the above-described object, the present invention is also directed to an imaging apparatus comprising: a solid-state image sensor having a structure in which a large number of pixel cells each comprised of a combination of a main photosensitive pixel having a relatively large area and a subsidiary photosensitive pixel having a relatively small area are arranged according to a predetermined arrangement form, and a signal according to a signal charge photoelectrically converted with the main photosensitive pixel and a signal according to a signal charge photoelectrically converted with the subsidiary photosensitive pixel are selectively fetched; a determination device which determines whether or not the level of a signal obtained from a main photosensitive pixel of a pixel cell existing around the pixel cell including the defective subsidiary photosensitive pixel is lower than a predetermined saturation level indicating a saturated output if the main photosensitive pixel constituting the pixel cell is a normal pixel and the subsidiary photosensitive pixel is a defective pixel for any pixel cell of the solid-state image sensor; and a defective pixel correcting device which corrects the pixel value of the defective subsidiary photosensitive pixel according to the pixel value of the main photosensitive pixel in the pixel cell identical to that of the defective subsidiary photosensitive pixel if it is determined by the determination device that the level of the signal obtained from the main photosensitive pixel of the pixel cell existing around the pixel cell including the defective pixel is lower than the saturation level.

Preferably, color filters of same color components are placed for the main photosensitive pixel and the subsidiary photosensitive pixel in the same pixel cell, and one microlens is provided for one pixel cell above each pixel cell.

In order to attain the above-described object, the present invention is also directed to a digital camera comprising an imaging device having an imaging area comprised of a plurality of pixels and having two types of light-receiving elements of different light-receiving sensitivities and light-receiving signal saturation levels for each pixel, the digital camera comprising: a memory which stores pixel information for defining as a defective pixel a pixel having a defect in at least one light-receiving element; and a correction processing circuit which corrects an output signal of the defective pixel according to the pixel information.

The digital camera corrects the output signal of the defective pixel according to pixel information for defining as a defective pixel a pixel having a defect in at least one light-receiving element, thus making it possible to carry out correction efficiently using a small amount of information relative to the number of light-receiving elements.

The present invention is also directed to a method for creating pixel information in an imaging device having an imaging area comprised of a plurality of pixels and having first and second light-receiving elements of different light-receiving sensitivities and light-receiving signal saturation levels for each pixel, the method comprising the steps of: reading an output signal of the first light-receiving element for each pixel to create information indicating whether the pixel is defective or not; reading an output signal of the second light-receiving element for each pixel to create information indicating whether the pixel is defective or not; and computing a logic sum of a plurality of information created in the above steps and creating pixel information for defining as a defective pixel a pixel with the result of the computation being equal to 1.

According to the present invention, pixel information for defining as a defective pixel a pixel having a defect in at least one light-receiving element can be created correctly.

The present invention is also directed to a method for creating pixel information in an imaging device having an imaging area comprised of a plurality of pixels, with each pixel having first and second light-receiving elements of different light-receiving sensitivities and light-receiving signal saturation levels, the method comprising the steps of: reading an output signal of the first light-receiving element and an output signal of the second light-receiving element at a time for each pixel to create information indicating whether the pixel is defective or not; reading an output signal of the first light-receiving element for each pixel to create information indicating whether the pixel is defective or not; reading an output signal of the second light-receiving element for each pixel to create information indicating whether the pixel is defective or not; and computing a logic sum of a plurality of information created in the above steps and creating pixel information for defining as a defective pixel a pixel with the result of the computation being equal to 1.

According to the present invention, pixel information for defining as a defective pixel a pixel having a defect in at least one light-receiving element can be created correctly and more quickly.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 20 is a block diagram showing an example of structure of a digital camera according to an embodiment of the present invention.

DETAILED DESCRIPTION OF THE PREFERRED EMBODIMENTS

The preferred embodiment of the present invention will be described in detail according to the attached drawings.

Figure 1:
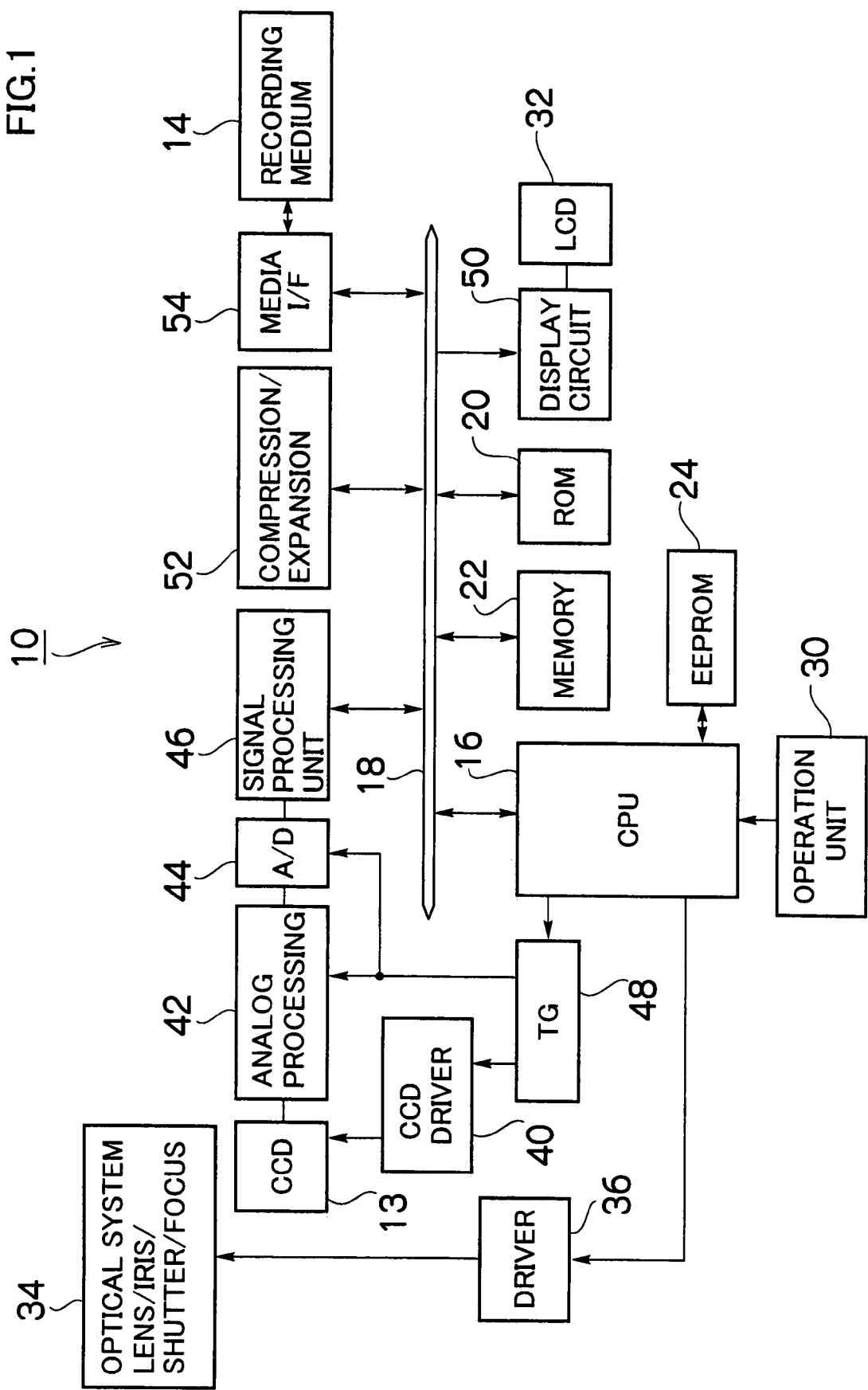
FIG. 1 is a block diagram showing the configuration of an electronic camera according to an embodiment of the present invention.

FIG. 1 is a block diagram showing the configuration of an electronic camera according to an embodiment of the present invention. The camera 10 is a digital camera converting into digital image data an optical image of a subject captured through a CCD solid-state image sensor (hereinafter referred to as CCD) 13, and a method for correcting a defective image according to an embodiment of the present invention is applied to part of a signal processing device which processes an image signal obtained from the CCD 13.

The overall operation of the camera 10 is generally controlled by a central processing unit (CPU) 16 built in the camera 10. The CPU 16 functions as a control device which controls a main camera system according to predetermined programs, and functions as a computation device which performs a various kinds of computations such as automatic exposure (AE) computation, automatic focus adjustment (AF) computation, auto white balance (AWB) control and computation for correction of defective pixels.

The CPU 16 is connected to a read only memory (ROM) 20 and a memory such as a random access memory (RAM) 22 through a bus 18. Programs executed by the CPU 16, various kinds of data required for control, and the like are stored in the ROM 20. The memory 22 is used as an area for expansion of programs and a computation work area of the CPU 16, and also used as an area for temporary storage of image data.

An electrically erasable programmable random access memory (EEPROM) 24 is connected to the CPU 16. The EEPROM 24 is a nonvolatile storage device in which position information of defective pixels of the CCD 13, data required for control of AE, AF, AWB and the like or customization information set by the user, and is capable of rewriting data as necessary, and contents of information are retained even when the power is off. The CPU 16 performs computation and the like referring to the EEPROM 24 as necessary.

The camera 10 is provided with an operation unit 30 for the user to input various kinds of commands. The operation unit 30 includes various kinds of operation units such as a shutter button, a zoom switch and a mode changeover switch. The shutter button is an operation device for inputting an instruction to start taking a picture, and is comprised of a two-stage stroke-type switch having an S1 switch that is turned on when the button is semi-pressed, and an S2 switch that is turned on when the button is full-pressed. AE processing and AF processing is performed with S1 on, and light exposure for recording is performed with S2 on. The zoom-switch is an operation device which changes an image-capturing scaling factor and a play-back scaling factor. The mode changeover switch is an operation device for switching between an image-capturing mode and a play-back mode.

Furthermore, the operation unit 30 also includes, in addition to the devices described above, an image-capturing mode setting device which sets an optimum operation mode (continuous-exposure mode, auto image-capturing mode, manual image-capturing mode, figure mode, landscape mode, night view mode, etc.) depending on image-capturing purposes, and operation devices such as a menu button for displaying a menu screen on a liquid crystal monitor (display device) 32, a cross button (cursor shift operation button) for selecting a desired item from the menu screen, an OK button for providing a command to define a selected item or carry out a process, and a cancel button for inputting a command to delete a desired object such as a selected item, cancel directive contents, or make a return to an immediate preceding operation state.

Furthermore, the operation unit 30 includes not only configurations such as a push-type switch member, a dial member and a lever switch, but also configurations achieved through user interfaces such that a desired item is selected from a menu screen.

A signal from the operation unit 30 is inputted to the CPU 16. The CPU 16 controls each circuit of the camera 10 according to the input signal from the operation unit, and performs, for example, lens drive control, image-capturing operation control, image processing control, image data recording/play-back control, display control of a liquid crystal monitor 32.

The liquid crystal monitor 32 can be used as an electronic finder for checking an angle of view when an image is captured, and is also used as a device which plays-back and displaying a recorded image. The liquid crystal monitor 32 is also used as a display screen for user interfaces, on which information such as menu information, selection items and setting contents is displayed as necessary. Furthermore, a display device of a different system such as an organic EL may also be used instead of the liquid crystal display.

An image-capturing function of the camera 10 will now be described.

The camera 10 comprises an optical system unit 34 and the CCD 13. An image sensor of a different system such as an MOS-type solid-state imaging system can be used instead of the CCD 13. The optical system unit 34 includes a taking lens (not shown) and an iris and mechanical shutter mechanism. The taking lens is comprised of a motorized zoom lens, and although a detailed optical configuration is not shown in the drawing, the taking lens mainly includes a scaling factor-variable lens group effecting a scaling factor changing (focal distance variable) action, a correction lens group, and a focus lens contributing to focus adjustment.

When the zoom switch of the operation unit 30 is operated by the user, an optical system control signal is outputted from the CPU 16 to a motor drive circuit 36 according to the switch operation. The motor drive circuit 36 generates a signal for driving the lens according to the control signal from the CPU 16, and gives the signal to a zoom motor (not shown). In this way, the zoom motor is actuated by a motor drive voltage outputted from the motor drive circuit 36, and the scaling factor-variable lens group and the correction lens group in the taking lens makes a back-and-forth motion along an optical axis, whereby the focus distance (optical zoom scaling factor) of the taking lens is changed.

Light passing through the optical system unit 34 enters the light-receiving surface of the CCD 13. A large number of photo sensors (light-receiving elements) are arranged in a plane form on the light-receiving surface of the CCD 13, and color filters of primary colors of red (R), green (G) and blue (B) are arranged in a predetermined arrangement structure in correspondence with each photo sensor.

A subject image formed on the light-receiving surface of the CCD 13 is converted by each photo sensor into an amount of signal charge corresponding to an amount of incident light. The CCD 13 has an electronic function to control charge accumulation time (shutter speed) of each photo sensor according to timing of a shutter gate pulse.

Signal charges accumulated in each photo sensor of the CCD 13 are sequentially read as voltage signals (image signals) corresponding to signal charges according to pulses given from a CCD driver 40, and image signals outputted from the CCD 13 are sent to an analog processing unit 42. The analog processing unit 42 is a processing unit including a correlation double sampling (CDS) circuit and a gain adjustment circuit and in this analog processing unit 42, sampling processing and processing of color separation into color signals of R, G and B is performed, and the signal level of each color signal is adjusted.

The image signal outputted from the analog processing unit 42 is converted into a digital signal by an A/D converter 44, and then stored in a memory 22 via a digital signal processing unit 46. A timing generator (TG) 48 gives timing signals to the CCD driver 40, the analog processing unit 42 and the A/D converter 44 according to a command by the CPU 16, and circuits are synchronized with the timing signals.

The signal processing unit 46 is a digital signal processing block also serving as a remote controller for controlling read/write in the memory 22. The signal processing unit 46 is an image processing device including defective pixel correcting unit, an auto computation unit which performs AE/AF/AWB processing, a white balance circuit, a gamma conversion circuit, a synchronization circuit (processing circuit for correcting a spatial displacement of a color signal associated with a color filter arrangement of a single plate CCD to calculate the color of each point), a luminance/color difference signal luminance/color difference signal generation circuit, a contour correction circuit and a contrast correction circuit, and processes image signals according to a command from the CPU 16 while making use of the memory 22.

Data (CCDRAW data) stored in the memory 22 is sent to the signal processing unit 46 via the bus 18. Image data inputted to the signal processing unit 46 is subjected to predetermined processing such as white balance adjustment processing, gamma conversion processing, and processing for conversion into a luminance signal (Y signal) and a color difference signal (Cr, Cb signal) (YC processing), and then stored in the memory 22.

If a captured image is monitor-outputted, image data is read from the memory 22, and sent to a display circuit 50. The image data sent to the display circuit 50 is converted into a signal of a predetermined mode for display (e.g., color combined image signal of NTSC mode), and then outputted to the liquid crystal monitor 32. Image data in the memory 22 is periodically rewritten by the image signal outputted from the CCD 13, and the image signal generated from the image data is supplied to the liquid crystal monitor 32, whereby an image being captured (through image) is displayed on the liquid crystal monitor 32 in real time. The user can observe an angle of view (composition) by an image (so called a through movie) displayed on the liquid crystal monitor 32.

When the user determines an angle of view and presses the shutter button, then the CPU 16 detects this, and performs AE processing and AF processing in response to semi-press of the shutter button (S1=ON), and starts CCD exposure and read control for capturing an image for recording in response to full press of the shutter button (S2=ON).

That is, the CPU 16 performs a various kinds of computations such as focus evaluation computation and AE computation from image data captured in response to S1=ON, sends a control signal to the motor drive circuit 36 according to the result of the computations, and controls an AF motor (not shown) to shift the focus lens in the optical system unit 34 to a focusing position.

The AE computation unit includes a circuit for dividing one screen of a captured image into a plurality of areas (e.g., 16×16) and integrating RGB signals for each divided area, and supplies the integrated value to the CPU 16. The integrated value may be determined for each of color signals of RGB, or the integrated value may be determined for only one (e.g., G signal) of these color signals.

The CPU 16 performs weight summation according to the integrated value obtained from the AE computation unit, detects a brightness of a subject (subject luminance), and calculates an exposure value (image-capturing EV value) suitable for image-capturing.

For accurately carrying out photometry over a wide dynamic range, the AE of the camera 10 carries out photometry two or more times to recognize a luminance of a subject correctly. Provided that when photometry is carried out over a range of 5 to 17 EV, photometry can be carried out over a range of 3 EV with one-time photometry, for example, photometry is carried out four times at the maximum while changing exposure conditions.

Photometry is carried out under certain exposure conditions, and the integrated value of each divided area is monitored. If any saturated area exists in the image, photometry is carried out while changing exposure condition. On the other hand, if no saturated area exists in the image, photometry can be carried out correctly, and therefore a further change of exposure conditions is not made.

In this way, photometry can be carried out two or more times to perform photometry over a wide range (5 to 17 EV), and optimum exposure conditions are determined. Furthermore, a range that can or should be measured with one-time photometry can be set for each type of camera as appropriate.

The CPU 16 controls an iris and a shutter speed according to the result of the AE computation described above, and acquires an image for recording in response to S2=ON.

Image data captured in response to full-press of the shutter button (S2=ON) is subjected to YC processing and other predetermined signal processing in the signal processing unit 46 shown in FIG. 1, and then compressed according to a predetermined format (e.g., JPEG format) in a compression/expansion circuit 52. The compressed image data is recorded in the recording medium 14 via a media interface unit 54. The compression format is not limited to JPEG format, but MPEG or other formats may be employed.

For the device which stores image data, a various kinds of media such as semiconductor memory cards represented by Smart Media™, Compact Flash™, and the like, magnetic disks, optical disks and magneto optic disks. The device which stores image data is not limited to a removal medium, but may be a recording medium (internal memory) built in the camera 10.

When a play-back mode is selected by a mode selection switch of the operation unit 30, a last image file recorded (file last recorded) in the recording media is read. Data of the image file read from the recording media 14 is subjected to expansion processing by the compression and expansion circuit 52, and outputted to the liquid crystal monitor 32 through a display circuit 50.

By operating the cross button during one frame play-back in a play-back mode, the frame can be forwarded in a normal or inverse direction, a next file frame-forwarded is read from the recording media 14, and a displayed image is updated.

Figure 2:
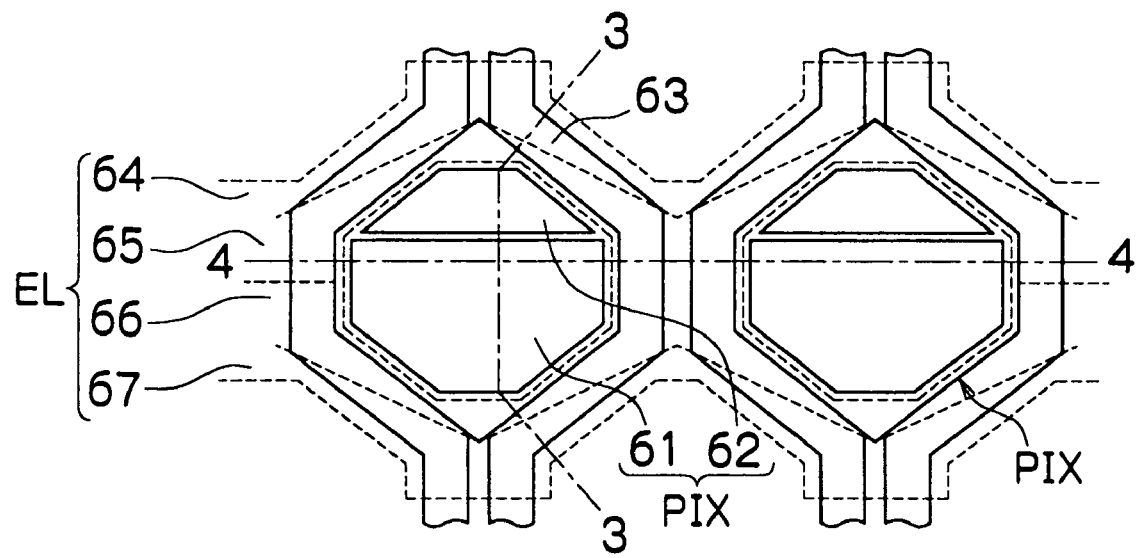
FIG. 2 is a plan view showing the structure of a light-receiving surface of a CCD shown in FIG. 1.

FIG. 2 is a plan view showing the structure of the light-receiving surface of the CCD 13. Two light-receiving cells (pixels PIX) arranged side by side is shown in FIG. 2 but actually, a large number of pixels PIX are arranged in the horizontal (longitudinal) direction and the vertical (transverse) direction at fixed arrangement pitches.

Each pixel PIX includes two photodiode areas 61 and 62 having different sensitivities. The first photodiode area 61 has a relatively large area, and constitutes a main photosensitive portion (hereinafter referred to as main photosensitive pixel). The second photodiode area 62 has a relatively small area, and constitutes a subsidiary photosensitive area (hereinafter referred to as subsidiary photosensitive pixel). A vertical transfer channel (VCCD) 63 is formed on the right side of the pixel PIX.

The structure shown in FIG. 2 is a pixel arrangement of honeycomb structure, and two upper and lower pixels PIX shown in the drawing are placed at positions displaced with respect to each other by half a pitch in the lateral direction. The vertical transfer channel 63 shown on the left side of pixels PIX shown in FIG. 2 is intended for reading charges from pixels (not shown) placed on the upper and lower sides of these pixels PIX, and transferring the charges.

As shown by broken lines in FIG. 2, transfer electrodes 64, 65, 66 and 67 (collectively denoted by EL) required for four-phase drive ($\phi1$, $\phi2$, $\phi3$, $\phi4$) are placed above the vertical transfer channel 63. If the transfer electrode is constituted by two-layer polysilicon, for example, the first transfer electrode 64 to which a pulse voltage of $\phi1$ is applied, and the third electrode 66 to which a pulse voltage of $\phi3$ is applied are constituted by a first-layer polysilicon layer, and the second transfer electrode 65 to which a pulse voltage of $\phi2$ is applied, and the fourth electrode 67 to which a pulse voltage of $\phi4$ is applied are constituted by a second-layer polysilicon layer. Furthermore, the transfer electrode 64 also controls the reading of charges from the subsidiary photosensitive pixel 62 to the vertical transfer channel 63. The transfer electrode 65 also controls the reading of charges from the main photosensitive pixel 61 to the vertical transfer channel 63.

Figure 3:
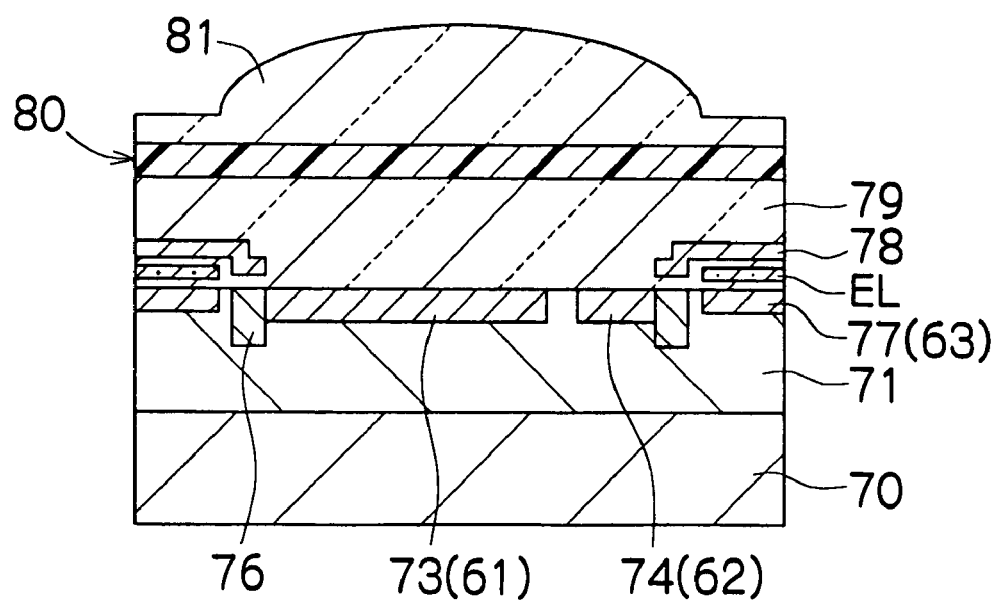
FIG. 3 is a sectional view taken along a line 3-3 of FIG. 2.
Figure 4:
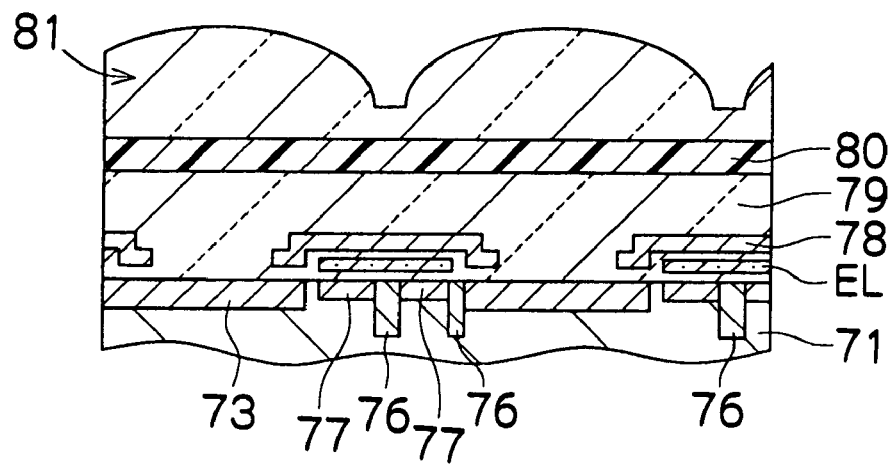
FIG. 4 is a sectional view taken along a line 4-4 of FIG. 2.

FIG. 3 is a sectional view taken along a line 3-3 of FIG. 1, and FIG. 4 is a sectional view taken along a line 4-4 of FIG. 1. As shown in FIG. 3, a p-type well 71 is formed on one surface of an n-type semiconductor substrate 70. Two n-type areas 73 and 74 are formed on a surface area of the p-type well 71 to form a photodiode. A photodiode in an n-type area denoted by reference numeral 73 corresponds to the main photosensitive pixel 61, and a photodiode in an n-type area denoted by reference numeral 74 corresponds to the subsidiary photosensitive pixel 62. A $p^+$-type area 76 is a channel stop area where pixels PIX, the vertical transfer channel 63 and the like are electrically separated.

As shown in FIG. 4, an n-type area 77 constituting the vertical transfer channel 63 is placed near the n-type area 73 constituting the photodiode. The p-type well 71 between the n-type areas 74 and 77 constitutes a reading transistor.

An insulation layer such as silicon oxide film is formed on the surface of the semiconductor substrate, and the transfer electrode EL made of polysilicon is formed thereon. The transfer electrode EL is so situated as to cover over the vertical transfer channel 63. An insulation layer of silicon oxide or the like is further formed on the transfer electrode, and a light-blocking film 78 covering components such as the vertical transfer electrode 63 and having an opening above the photodiode is formed thereon by tungsten or the like.

An inter-layer insulation film 79 made of phosphosilicate glass or the like is formed in such a manner as to cover the light-blocking film 78, and the surface of the film is flattened. A color filter layer 80 is formed on the inter-layer insulation film 79. The color filter layer 80 includes color areas of three or more colors such as red, green and blue areas, for example, and a color area of one color is assigned for each pixel PIX.

On the color filter layer, micro-lenses 81 are formed by a resist material or the like in correspondence with pixels PIX. One micro-lens 81 is formed on each pixel PIX, and has a function of collecting light incident from above in the opening delimited by the light-blocking film 78.

Light incident through the micro-lens 81 is color-separated through the color filter layer 80, and enters each photodiode area of the main photosensitive pixel 61 and the subsidiary photosensitive pixel 62. Light entering each photodiode area is converted into a signal charge corresponding to the amount of light, and individually read out to the vertical transfer channel 63.

In this way, two types of image signals of different sensitivities (high sensitivity image signal and low sensitivity image signal) can be individually fetched from one pixel PIX, and image signals of optically same phases are obtained.

Figure 5:
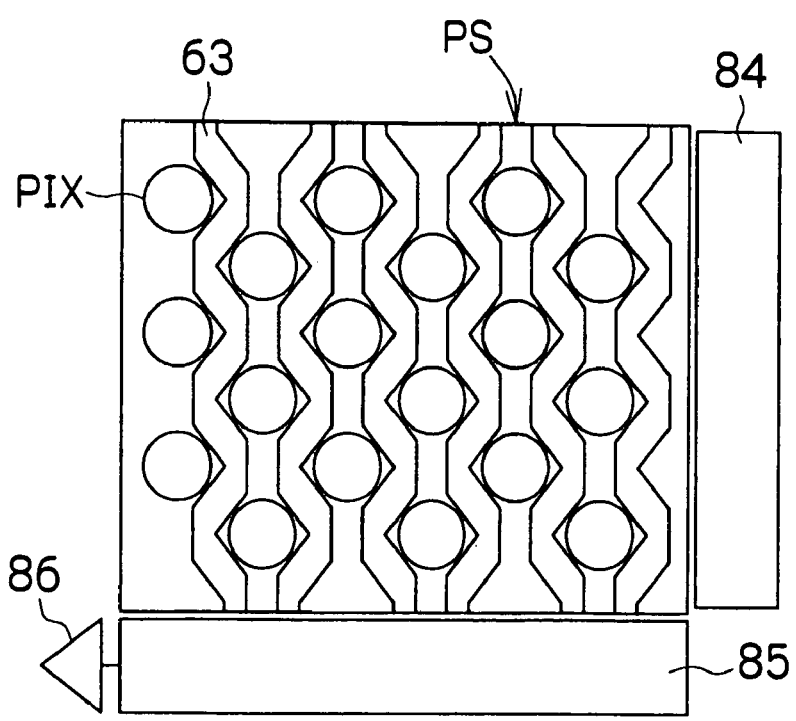
FIG. 5 is a schematic plan view showing the overall structure of the CCD shown in FIG. 1.

FIG. 5 shows the arrangement of pixels PIX and the vertical transfer channel 63 in the light-receiving area of the CCD 13. Pixels PIX are arranged in a honeycomb structure such that central points of geometric shapes of cells are shifted in an alternate manner by half the pixel pitch (½ pitch) in longitudinal and transverse directions. That is, in lines (or rows) of pixels PIX adjacent to each other, a cell arrangement in one line (or row) is shifted by almost ½ of the arrangement space in the longitudinal (or transverse) direction relative to a cell arrangement in the other line (or row).

A VCCD drive circuit 84 applying a pulse voltage to the transfer electrode EL is placed on the right side of the light-receiving area PS in which pixels PIX are arranged in FIG. 5. As described above, each pixel PIX includes the main photosensitive portion (main pixel) and the subsidiary photosensitive portion (subsidiary pixel). The vertical transfer channel 63 is placed near each row in a zigzag form.

A horizontal transfer channel (HCCD) 85 transferring in the horizontal direction a signal charge transferred from the vertical transfer channel 30 is provided on the lower side of the light-receiving area PS (on the lower end side of the vertical transfer channel 63).

The horizontal transfer channel 85 is constituted by a transfer CCD of two-phase drive, and the last stage of the horizontal transfer channel 85 (leftmost stage in FIG. 1) is connected to an output unit 86. The output unit 86 includes an output amplifier, detects an inputted signal charge, and outputs the charge to an output terminal as a signal voltage. In this way, signals photoelectrically converted in pixels PIX are outputted as a dot sequential signal row.

Figure 6:
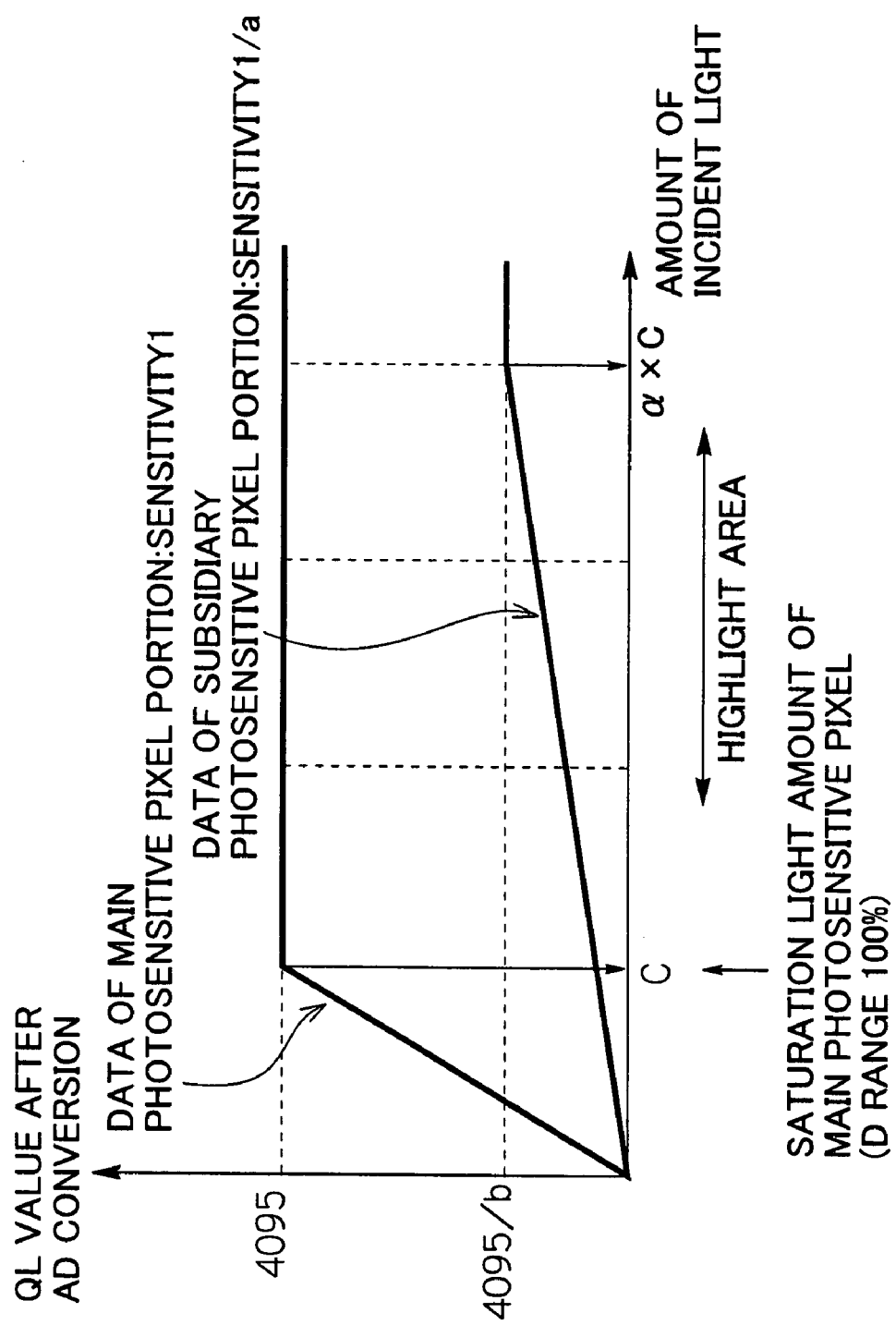
FIG. 6 is a graph showing the photoelectric conversion characteristics of a main photosensitive pixel and a subsidiary photosensitive pixel.

FIG. 6 is a graph showing the photoelectric conversion characteristics of the main photosensitive pixel 61 and the subsidiary photosensitive pixel 62. The lateral axis shows the amount of incident light, and the longitudinal axis shows the image data value after A/D conversion (QL value). In this example, 12-bit data is shown as an example, but the number of bits is not limited thereto.

As shown in the drawing, the sensitivity ratio between the main photosensitive pixel 61 and the subsidiary photosensitive pixel 62 is 1:1/a (a>1). An output of the main photosensitive pixel 61 gradually increases in proportion to the amount of incident light, and the output reaches a saturated value (QL value=4095) when the amount of incident light is "c". Thereafter, the output of the main photosensitive pixel 61 remains constant even if the amount of incident light increases. The "c" is called a saturation light amount of the main photosensitive pixel 61.

On the other hand, the sensitivity of the subsidiary photosensitive pixel 62 is 1/a of the sensitivity of the main photosensitive pixel 61, and is saturated at the QL value=4095/b when the amount of incident light is $\alpha \times c$ (b>1, $\alpha = a/b$). "$\alpha \times c$" at this time is called a saturation light amount of the subsidiary photosensitive pixel 62.

In this way, by combining the main photosensitive pixel and the subsidiary photosensitive pixel having different sensitivities, the dynamic range of the CCD 13 can be increased by a factor of α (by a factor of about 4 in this example) compared to the configuration with only the main photosensitive pixel.

AE processing and AF processing associated with S1=ON of the shutter button is performed according to a signal obtained from the main photosensitive pixel 61. If an image-capturing mode in which wide dynamic range imaging is performed is selected, or the wide dynamic range imaging mode is automatically selected as a result of AE (such as ISO sensitivity and photometric value) or according to a white balance gain value or the like, the CCD 13 is exposed to light in response to S2=ON of the shutter button and after the exposure, a charge of the main photosensitive pixel 61 is first read, and a charge of the subsidiary photosensitive pixel 62 is then read, in synchronization with a vertical drive signal (VD) with the mechanical shutter closed to block entrance of light.

Processing of the output signal of the CCD 13 will be described below.

Figure 7:
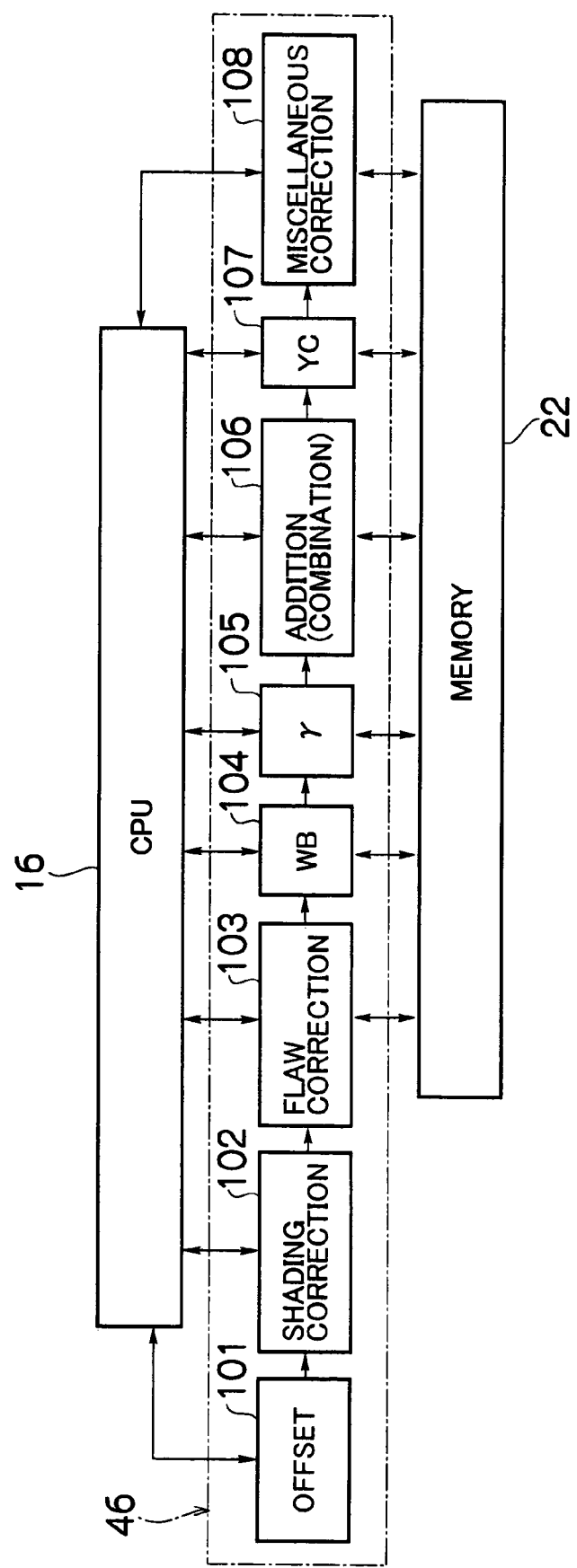
FIG. 7 is a block diagram showing the detailed configuration of a signal processing unit shown in FIG. 1.

FIG. 7 is a block diagram showing the detailed configuration of the signal processing unit 46 shown in FIG. 1.

As shown in FIG. 7, the signal processing unit 46 comprises an offset processing unit 101, a shading correction unit 102, a flaw correction unit 103, a white balance (WB) gain unit 104, a gamma correction unit 105, an addition unit 106, a YC conversion unit 107 and a miscellaneous correction unit 108.

The offset processing unit 101 is a processing unit which corrects dark current components of the CCD output, and performs computation of subtracting from a pixel value a value of an optical black (OB) signal obtained from a light-blocking pixel on the CCD 13.

The shading correction unit 102 is a processing unit which corrects ununiformity of the CCD output associated with variation in light amount distribution caused by an optical system, and multiplies a pixel value by a correction coefficient previously prepared according to the position of the pixel PIX to uniformalize the output level.

Furthermore, since the main photosensitive pixel 61 and the subsidiary photosensitive pixel 62 are different in phenomenon of occurrence of luminance shading, different shading correction is carried out for the pixel value of the main photosensitive pixel 61 and the pixel value of the subsidiary photosensitive pixel 62. The periphery tends to be dark compared to the central area of the screen for the main photosensitive pixel 61, and unique shading (e.g., phenomenon such that the light amount in the periphery increases compared to the light amount in the central area of the screen) occurs in relation to the position of the micro-lens 81 and the position in the pixel PIX at which the subsidiary photosensitive pixel is formed for the subsidiary photosensitive pixel 62. Signal correction processing for eliminating these phenomena is carried out according to the shading patterns of the main photosensitive pixel 61 and the subsidiary photosensitive pixel 62.

The flaw correction unit 103 is a processing unit which corrects a signal value of a defective pixel of the CCD 13. The defect of the pixel PIX has three aspects including:

(1) the case where only the main photosensitive pixel 61 is flawed;

(2) the case where only the subsidiary photosensitive pixel 62 is flawed; and (3) the case where both the main photosensitive pixel 61 and the subsidiary photosensitive pixel 62 are flawed.

Algorithms of flaw correction corresponding to the above three aspects will be described in detail later, and correction methods include a conventional (lowpass filter-type) method of using the pixel value of a pixel PIX around a defective pixel to carry out correction, and a method of using the pixel value of a normal subsidiary photosensitive pixel or main photosensitive value in the same pixel PIX to carry out correction, and the correction methods can be changed depending on a situation.

Image data obtained by carrying out flaw correction processing by the flaw correction unit 103 is stored in the memory as CCDRAW data. The CCDRAW data stored in the memory 22 is sent to the WB gain unit 104.

The WB gain unit 104 includes a gain variable amplifier for increasing and decreasing the levels of color signals of R, G and B, and performs gain adjustment of each color signal according to a command from the CPU 16. A signal subjected to gain processing in the WB gain unit 104 is sent to the gamma correction unit 105.

The gamma correction unit 105 converts input/output characteristics so that they become desired gamma characteristics according to a command of the CPU 16. An image signal subjected to gamma correction is sent to the addition unit 106. The addition unit 106 is a processing unit adds (combines) an image signal obtained from the main photosensitive pixel and an image signal obtained from the subsidiary photosensitive pixel, and generates an output signal according to the following equation (1):

$$\text{Output signal} = g \times (\text{signal of main photosensitive pixel}) + (1-g) \times (\text{signal of subsidiary photosensitive pixel}) \quad (1)$$

where the coefficient g representing an addition ratio can be set as appropriate as long as the requirement of $0 \leq g \leq 1$ is met. The CPU 16 variably sets the coefficient g depending on a situation.

The output signal from the addition unit 106 is sent to the YC processing unit 107. The YC processing unit 107 includes a synchronization processing unit which interpolates spatial deviations of color signals associated with the color filter arrangement structure of the single plate CCD 13 to calculate the color (RGB) of each point, and a YC conversion processing unit which generates luminance/color difference signals from RGB signals.

The luminance/color difference signal (YCrCb) generated by the YC processing unit 107 is sent to the miscellaneous correction unit 108. The miscellaneous correction unit 108 includes, for example, a contour enhancement (aperture correction) unit and a color correction unit with a color difference matrix.

A flaw correction method in the camera 10 configured as described above will now be described.

Figure 8:
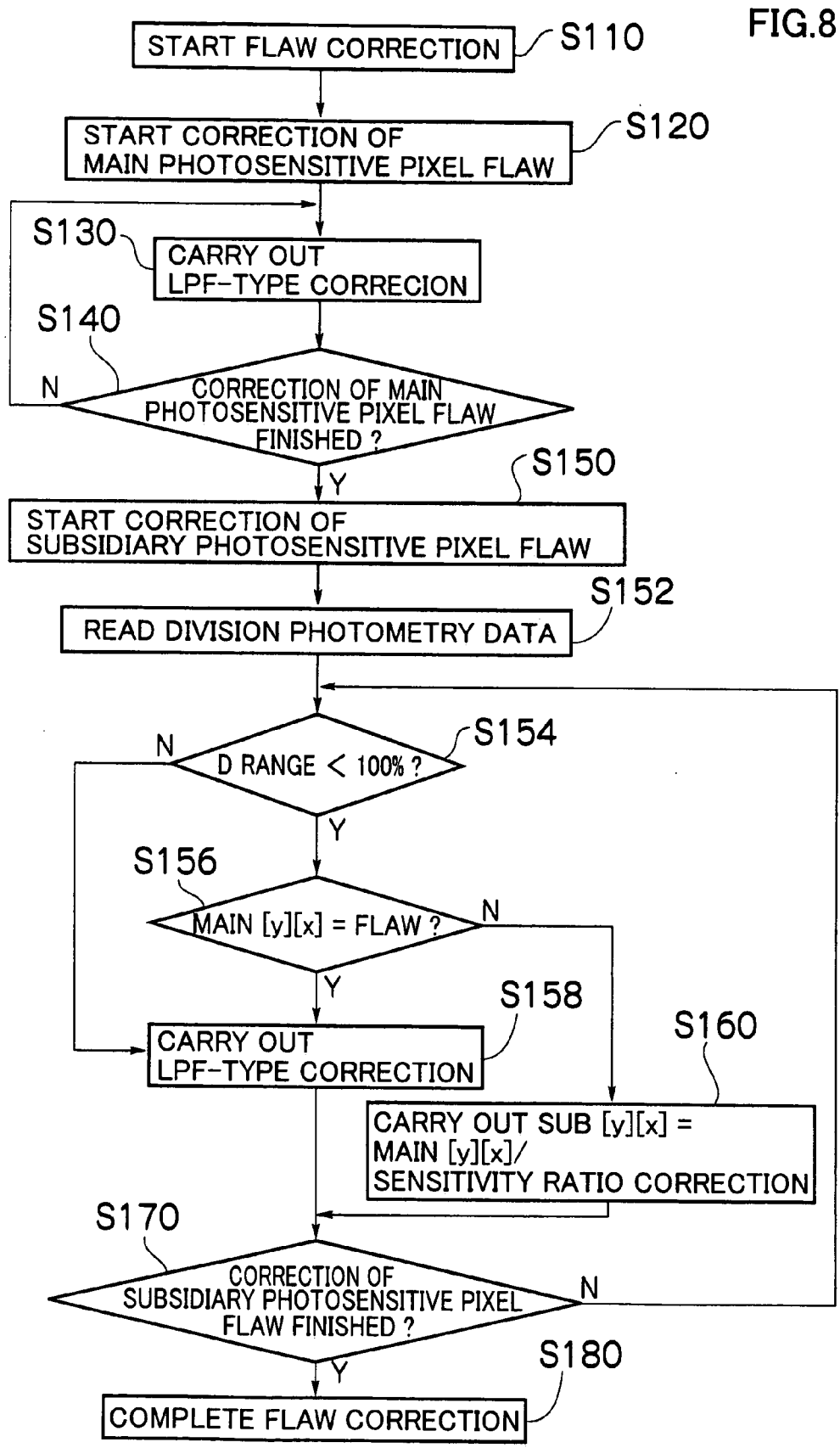
FIG. 8 is a flowchart of a flaw correction processing routine showing a first control example in the camera of the embodiment.

FIG. 8 is a flowchart of a flaw correction processing routine, showing a first control example. When processing of flaw correction is started (step S110), flaw correction of the main photosensitive pixel 61 is first carried out (step S120). Since position information of the defective pixel of the main photosensitive pixel 61 is already stored in the EEPROM 24, the pixel value of a normal main photosensitive pixel 61 situated around the defective pixel is used to perform lowpass filter (LPF)-type correction (correction such that the defective pixel is replaced with surrounding pixel information, or the average value of several pixels is outputted) according to the position information (step S130).

Whether or not the above LPF-type correction has been completed for all main photosensitive pixel flaws stored in the EEPROM 24 is determined (step S140), and if the correction has not been completed, correction processing of step S130 is repeated for other main photosensitive pixel flaws.

If it is determined at step S140 that correction has been completed for all main photosensitive pixel flaws, processing proceeds to step S150, where flaw correction of the subsidiary photosensitive pixel 62 is started. When the subsidiary photosensitive pixel flaw is corrected, first, data of division photometry is read for a division photometry area including the subsidiary photosensitive pixel flaw (step S152), and a determination is made on the dynamic range according to the photometry data (evaluation value indicating a luminance average of the area) (step S154).

Whether or not the luminance of the area (section) including the subsidiary photosensitive pixel flaw is within the dynamic range of the main photosensitive pixel (dynamic range is less than 100%) is determined (step S154), and if the dynamic range is less than 100%, i.e., it is an area where the photosensitive pixel data is not saturated, processing proceeds to step S156. Furthermore, a certain margin is preferably provided for determination on saturation.

At step S156, whether the main photosensitive pixel Main [y][x] in the pixel PIX identical to that of the subsidiary photosensitive pixel Sub [y][x] to be corrected is flawed or not is determined. This determination is performed according to defective pixel position information in the EEPROM 24.

If it is determined that the main photosensitive pixel Main [y][x] is flawed, i.e., both the main photosensitive pixel and subsidiary photosensitive pixel are flawed in a certain photosensitive pixel position ([y][x]), lowpass-type correction is performed as ever, and the pixel value is determined from information of each nearby photosensitive pixel (step S158).

On the other hand, if the main photosensitive pixel Main [y][x] is a normal pixel, at step S156, the subsidiary photosensitive pixel flaw is filled with a value obtained by dividing the output of the main photosensitive pixel Main [y][x] at the same position by a sensitivity ratio (step S160).

That is, the value of the subsidiary photosensitive pixel Sub [y][x] is determined according to the following equation (2):

$$\text{Sub }[y]/[x] = \text{Main }[y]/[x]/\text{sensitivity ratio} \quad (2)$$

By correcting the defect of the subsidiary photosensitive pixel 62 with the pixel value of the main photosensitive pixel 61 in the same pixel cell, a lowpass filter effect is reduced compared to conventional correction, and a resolution sensitivity can be maintained after correction.

After step S158 or step S160, processing proceeds to step S170. At step S170, whether or not correction has been completed for all subsidiary photosensitive pixel flaws stored in the EEPROM 24 is determined, and if the correction has not been completed, processing returns to step S154, where the above correction processing is repeated for other subsidiary photosensitive pixel flaws.

If it is determined that correction has been completed for all subsidiary photosensitive pixel flaws, at step S170, a sequence of flaw correction is finished (step S180).

At step S154, if the dynamic range is equal to or greater than 100%, i.e., in the case of an area in which main photosensitive pixel data is saturated, processing proceeds to step S158, where the subsidiary photosensitive pixel flaw is filled by lowpass filter-type correction.

The reason why when the flaw of the subsidiary photosensitive pixel 62 is corrected, the flaw is corrected with main photosensitive pixel data at the same position only for the section for which it is determined that the dynamic range is less than 100% in this way is that for the section with the dynamic range of 100% or greater, main photosensitive pixel data at the position same as that of the subsidiary photosensitive pixel flaw is saturated, and therefore correction is not correctly performed from a viewpoint of a level if correction is performed using data of the main photosensitive pixel.

Whether the main photosensitive pixel is saturated or not is determined from the evaluation value of each area shown by division photometry data in the flowchart of FIG. 8, but in another embodiment, the evaluation value of each area when an image is captured under exposure conditions determined by AE control may be predicted to determine whether the main photosensitive pixel is saturated or not from the predicted value.

Whether the main photosensitive pixel 61 is saturated or not may be determined directly from image data acquired with S2=ON after AE processing.

Figure 9:
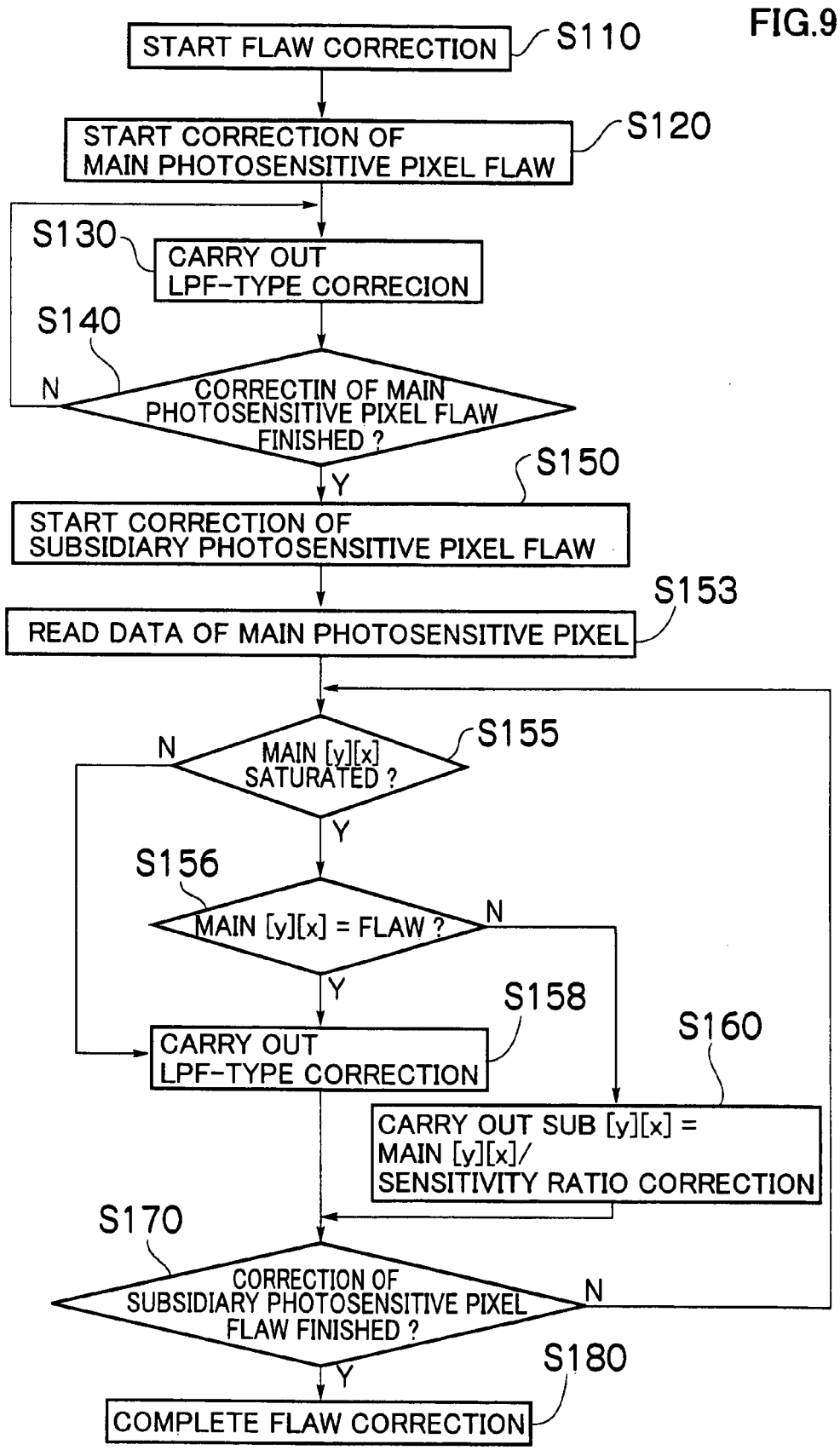
FIG. 9 is a flowchart of a flaw correction processing routine showing a second control example in the camera of the embodiment.

FIG. 9 is a flowchart of a flaw correction processing routine, showing a second control example. In FIG. 9, steps in common with the flowchart of FIG. 8 are given like step numbers, and descriptions thereof are not presented.

In the control example shown in FIG. 9, processing of step S153 and step S155 is carried out in place of processing steps of step S152 and step S154 in the flowchart of FIG. 8.

That is, according to FIG. 9, when correction of the subsidiary photosensitive pixel flaw is started (step S150), main photosensitive pixel data (pixel value of main photosensitive pixel) in the pixel PIX identical to that of the subsidiary photosensitive pixel flaw is read from the memory 22 (step S153), and whether the main photosensitive pixel Main [y][x] in the pixel PIX identical to that of the subsidiary photosensitive pixel Sub [y][x] to be corrected is saturated or not is determined (step S155).

The determination on saturation is performed by determining whether a saturation value is reached or not as shown in FIG. 6, but a value smaller than the saturation value (QL value=4095) may be set as a criterion value with a certain margin provided for the determination on saturation.

If it is determined that main photosensitive pixel data at the position same as that of the subsidiary photosensitive pixel flaw is saturated at step S155 in FIG. 9, conventional (lowpass filter-type) correction is carried out (step S158). On the other hand, if main photosensitive pixel data at the position same as that of the subsidiary photosensitive pixel flaw is not saturated, processing proceeds to step S156, where whether the main photosensitive pixel Main [y][x] is flawed or not is determined.

If the main photosensitive pixel Main [y][x] is flawed, low pass filter-type correction is carried out (step S158), and if the main photosensitive pixel Main [y][x] is a normal pixel, the output of the main photosensitive pixel Main[y][x] is used to determine a value of the subsidiary photosensitive pixel Sub [y][x] (step S160).

In this way, whether the main photosensitive pixel 61 is saturated or not may be determined according to actual main photosensitive pixel data acquired with S2=ON, instead of using division photometry data acquired in response to S1=ON.

In the control examples described with FIGS. 8 and 9, data of the subsidiary photosensitive pixel 62 is not used for flaw correction of the main photosensitive pixel 61, and thus there is an advantage that signal processing (white balance processing, gamma processing, etc.) of CCDRAW data of the main photosensitive pixel 61 can be immediately started when data of the subsidiary photosensitive pixel 62 is read after CCDRAW data of the main photosensitive pixel 61 is acquired.

Figure 10:
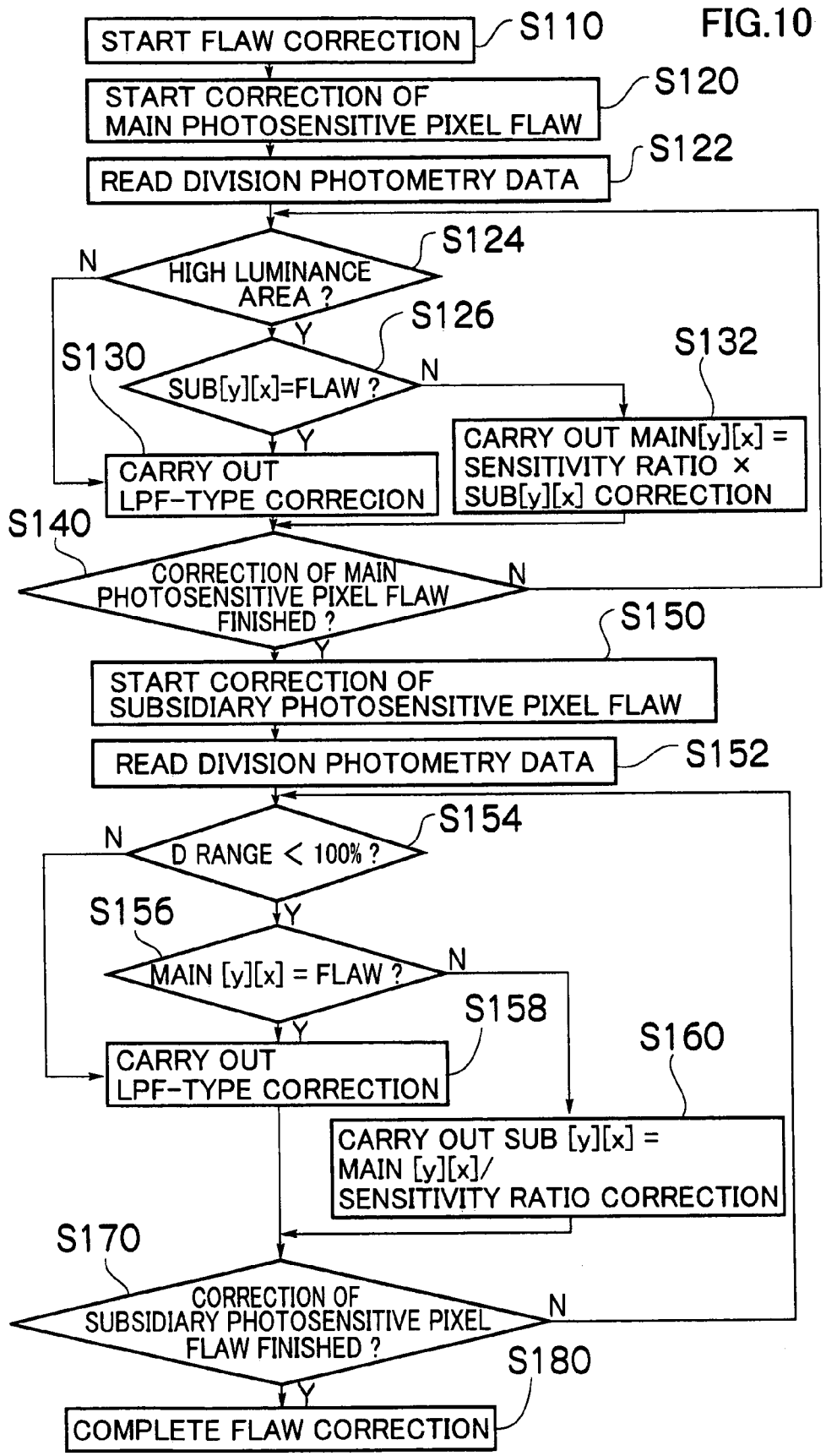
FIG. 10 is a flowchart of a flaw correction processing routine showing a third control example in the camera of the embodiment.

FIG. 10 is a flowchart of a flaw correction processing routine, showing a third control example. In FIG. 10, steps in common with the flowchart of FIG. 8 are given like step numbers, and descriptions thereof are not presented.

When correction of the main photosensitive pixel flaw is started at step S120 in FIG. 10, division photometry data during AE processing is first read for division photometry areas including flawed pixels (step S122), and a luminance is determined according to the photometry data (step S124).

At step S124, a luminance criterion value is defined, and whether or not acquired image data is in an area having a luminance greater than the criterion value is determined.

If it is determined at step S124 that the image data is in a high luminance area, processing proceeds to step S126, where whether the subsidiary photosensitive pixel Sub [y][x] in the pixel PDC identical to that of the main photosensitive pixel Main [y][x] to be corrected is flawed or not is determined. The determination is performed according to defective pixel position information in the EEPROM 24.

If the subsidiary photosensitive pixel Sub [y][x] is flawed, i.e., it is determined that both the main photosensitive pixel and subsidiary photosensitive pixel are flawed in a certain photosensitive pixel position ([y][x]), lowpass filter-type correction is carried out as ever (step S130) to fill the flaw from each nearby photosensitive pixel information.

On the other hand, at step S130, if the subsidiary photosensitive pixel Sub [y][x] is a normal pixel, the main photosensitive pixel flaw is filled with a value obtained by multiplying the output of the subsidiary photosensitive pixel Sub [y][x] at the same position by a sensitivity ratio (step S132).

That is, the value of the main photosensitive pixel Main [y][x] is determined according to the following equation (3):

$$\text{Main } [y][x] = \text{sensitivity ratio} \times \text{Sub } [y][x] \quad (3)$$

However, if the result of computation with the equation (3) exceeds a saturation output value, the output signal is clipped with the saturation output value.

If data of the subsidiary photosensitive pixel 62 is used to correct the flaw of the main photosensitive pixel 61, in this way, S/N may be deteriorated due to a large gain, and therefore a method of carrying out LPF-type correction as ever to fill the pixel value from nearby pixel information is used in a low luminance area (area having a luminance lower than the criterion value) where S/N may be further deteriorated due to gamma conversion or the like.

For an area close to a saturation light amount with a luminance greater than the criterion value, the subsidiary photosensitive pixel flaw can be adequately corrected with the output of the main photosensitive pixel in the same pixel PIX.

Furthermore, for an area with a high luminance exceeding the saturation light amount, the saturation output value (4095) of the main photosensitive pixel is exceeded even if data of the subsidiary photosensitive pixel is multiplied by a sensitivity ratio, and therefore the correction value is clipped with the saturation output value (4095).

After step S130 or step S132, processing proceeds to step S140. At step S140, whether or not the above LPF-type correction has been completed for all main photosensitive pixel flaws stored in the EEPROM 24 is determined (step S140), and if the correction has not been completed, processing returns to step S124, where correction processing is repeated for other main photosensitive pixel flaws.

If it is determined that correction has been completed for all main photosensitive pixel flaws at step S140, processing proceeds to step S150, where flaw correction of the subsidiary photosensitive pixel 62 is started. Correction of the subsidiary photosensitive pixel flaw has been described with FIG. 8.

Furthermore, in the control example shown in FIG. 10, the pixel value of the subsidiary photosensitive pixel 62 is used to correct the main photosensitive pixel flaw, and therefore data of the main photosensitive pixel 61 and data of the subsidiary photosensitive pixel 62 are both stored in the memory 22 on a temporary basis. Then, data of the main photosensitive pixel 61 and data of the subsidiary photosensitive pixel 62 are read from the memory 22 to carry out processing for correction of defects.

Figure 11:
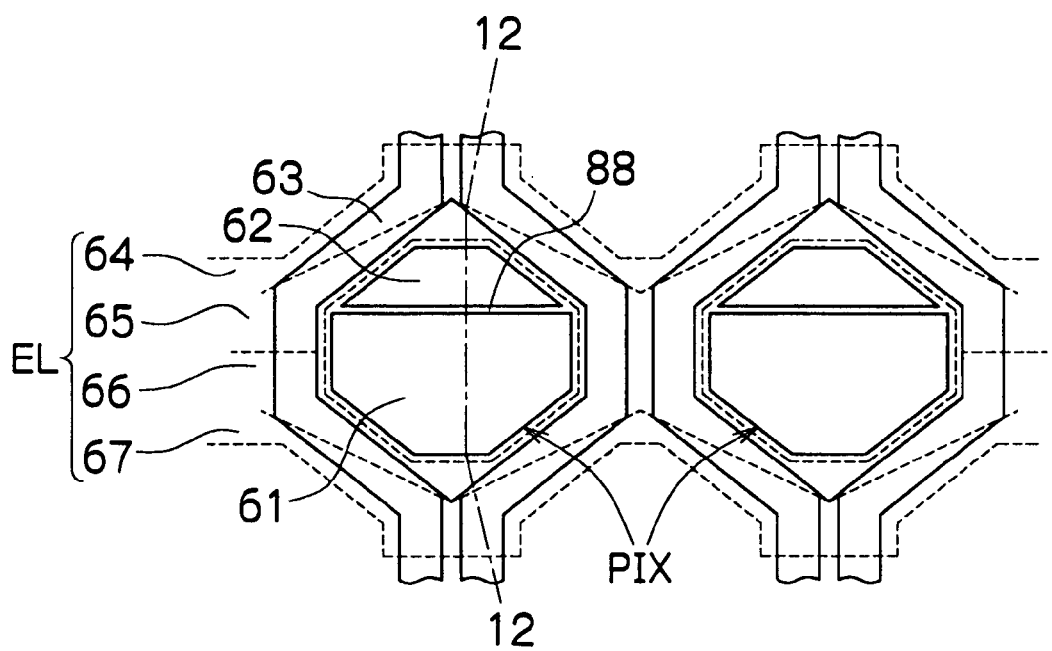
FIG. 11 is a plan view showing another example of structure of the CCD.
Figure 12:
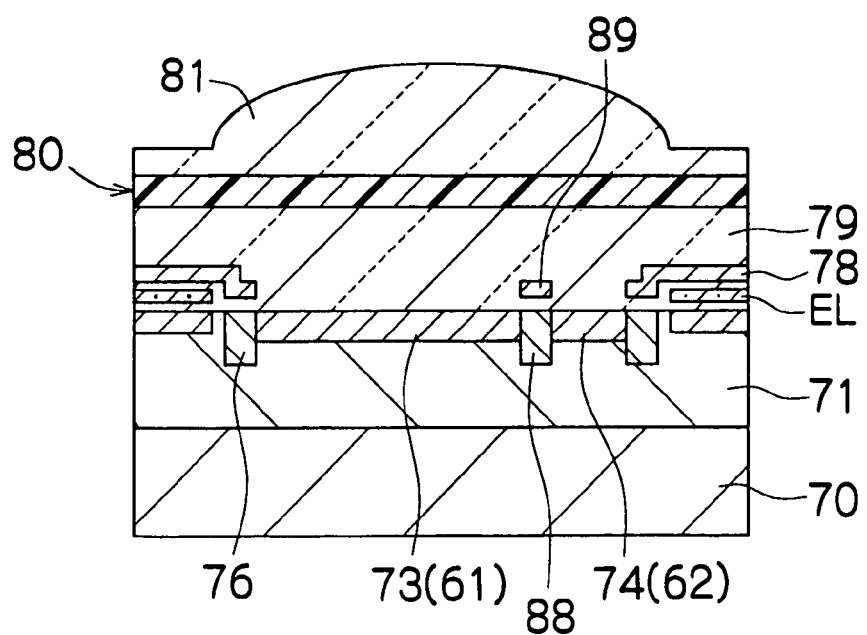
FIG. 12 is a sectional view taken along a line 12-12 of FIG. 11.

Another example of a structure of the CCD 13 is shown in FIG. 11. FIG. 11 is a plan view, and FIG. 12 is a sectional view taken along a line 12-12 of FIG. 11. In these drawings, members identical or similar to those of examples shown in FIGS. 2 and 3 are given like symbols, and descriptions thereof are not presented.

As shown in FIGS. 11 and 12, a $p^+$-type separation area 88 is formed between the main photosensitive pixel 61 and the subsidiary photosensitive pixel 62. This separation area 88 functions as a channel stop area (channel stopper), and electrically separates a photodiode area. A light-blocking film 89 is formed above the separation area 88 at a position corresponding to the separation area 88.

By using the light-blocking film 89 and the separation area 88, incident light is efficiently separated, and charges accumulated in the main photosensitive pixel 61 and the subsidiary photosensitive pixel 62 are prevented from subsequently being mixed. Other configurations are same as those of examples shown in FIGS. 2 and 3.

The cell geometry and opening geometry of the pixel PIX are not limited to examples shown in FIGS. 2 and 11, but may have a variety of forms such as polygonal shape and circular shape. Further, the separation form of light-receiving cells (division form) is not limited to the forms shown in FIGS. 2 and 9.

Figure 13:
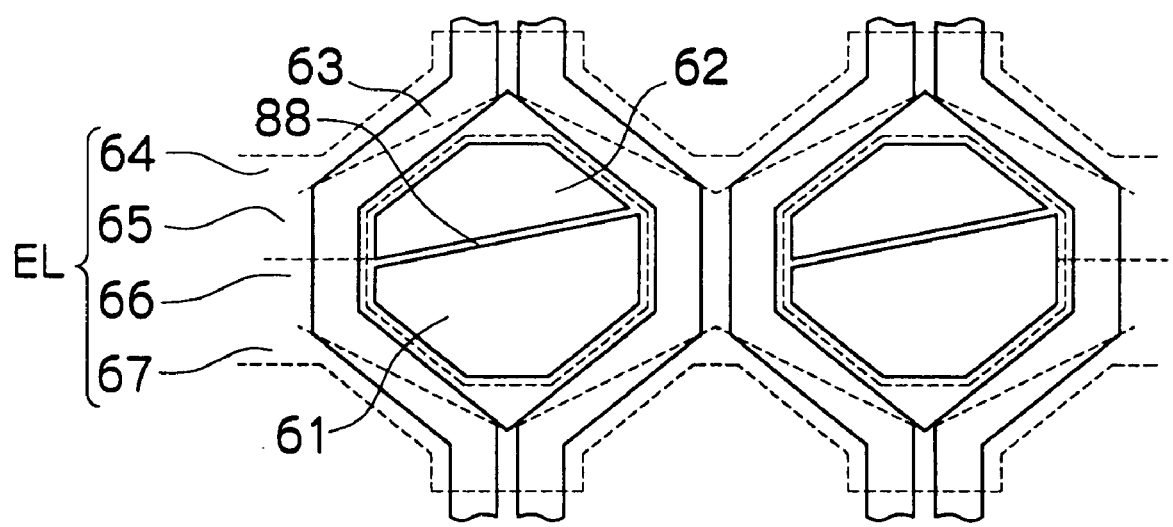
FIG. 13 is a plan view showing still another example of structure of the CCD.

Still another example of a structure of the CCD 13 is shown FIG. 13. In FIG. 13, members identical or similar to those of examples shown in FIGS. 2 and 11 are given like symbols, and descriptions thereof are not presented. FIG. 13 shows a configuration in which two photosensitive portions (61, 62) are separated along a slanting direction.

In this way, accumulated charges in respective division photosensitive areas should be capable of being separately read out to the vertical transfer channel, and the division form, the number of divided sections, the area size relation and the like are set as appropriate. However, the area of the subsidiary photosensitive pixel should be set to a value smaller than that of the area of the main photosensitive pixel. It is preferable that a reduction in area of the main photosensitive portion is inhibited to minimize a drop in sensitivity.

Another embodiment of the present invention will now be described.

Figure 14:
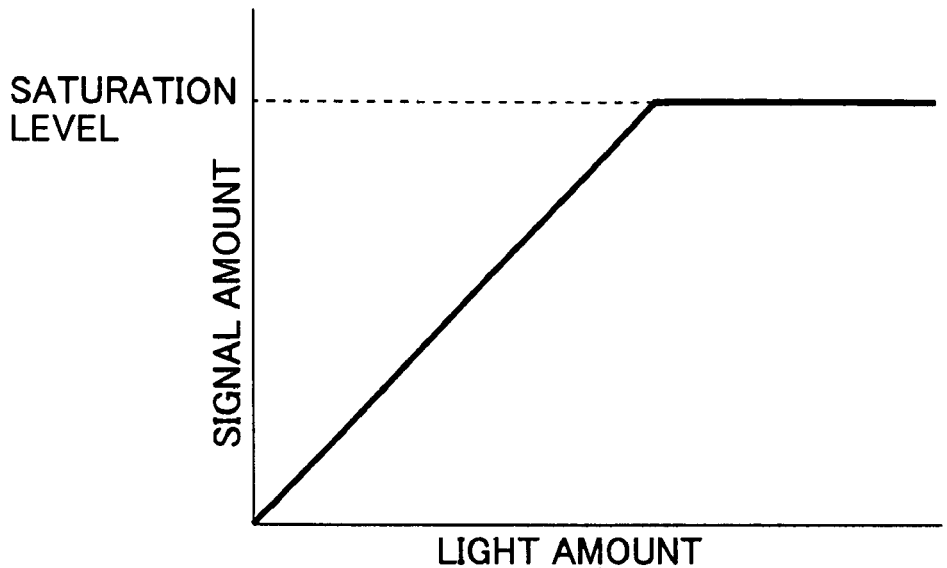
FIG. 14 shows a relation between the amount of incident light and the amount of output signals (sensitivity curve) in a general imaging device.

An imaging device mounted on a digital camera is limited in light amount capable of being photoelectrically converted, and if the amount of received light reaches a certain level, the output signal (light-receiving signal) is saturated as shown in FIG. 14. This phenomenon is generally found in imaging devices.

Figure 15:
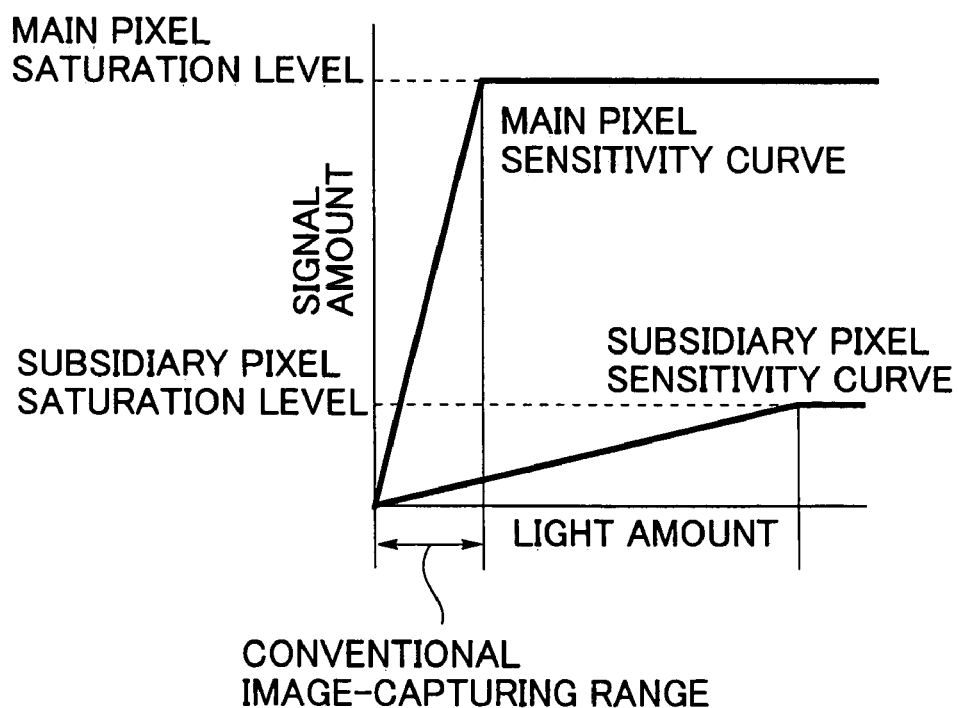
FIG. 15 is principle explanatory view of an imaging device having a main pixel and a subsidiary pixel for each pixel.

Thus, in the imaging device mounted on the digital camera according to the embodiment of the present invention, two types of light-receiving elements of different light-receiving sensitivities (hereinafter, a light-receiving element having a relatively high sensitivity is referred to as a main pixel, and a light-receiving element having a low sensitivity is referred to as a subsidiary pixel) are made to exist in the same imaging device, and the saturation level of the subsidiary pixel is set to a level equal to or greater than the decreasing rate of the sensitivity thereof. For example, the sensitivity of the subsidiary pixel is set to $\frac{1}{16}$, and the saturation level is set to $\frac{1}{4}$ compared to the main pixel. Then, as shown in FIG. 15, photoelectric conversions can be made, i.e., imaging can be performed up to an amount of light that is four times as large as that of the main pixel. The dynamic range is increased by 400%.

The configuration of the imaging device mounted on the digital camera according to the embodiment of the present invention has been described with FIGS. 2 to 5 and FIGS. 11 to 13.

A method for creating pixel information according to an embodiment of the present invention will now be described.

Figure 16:
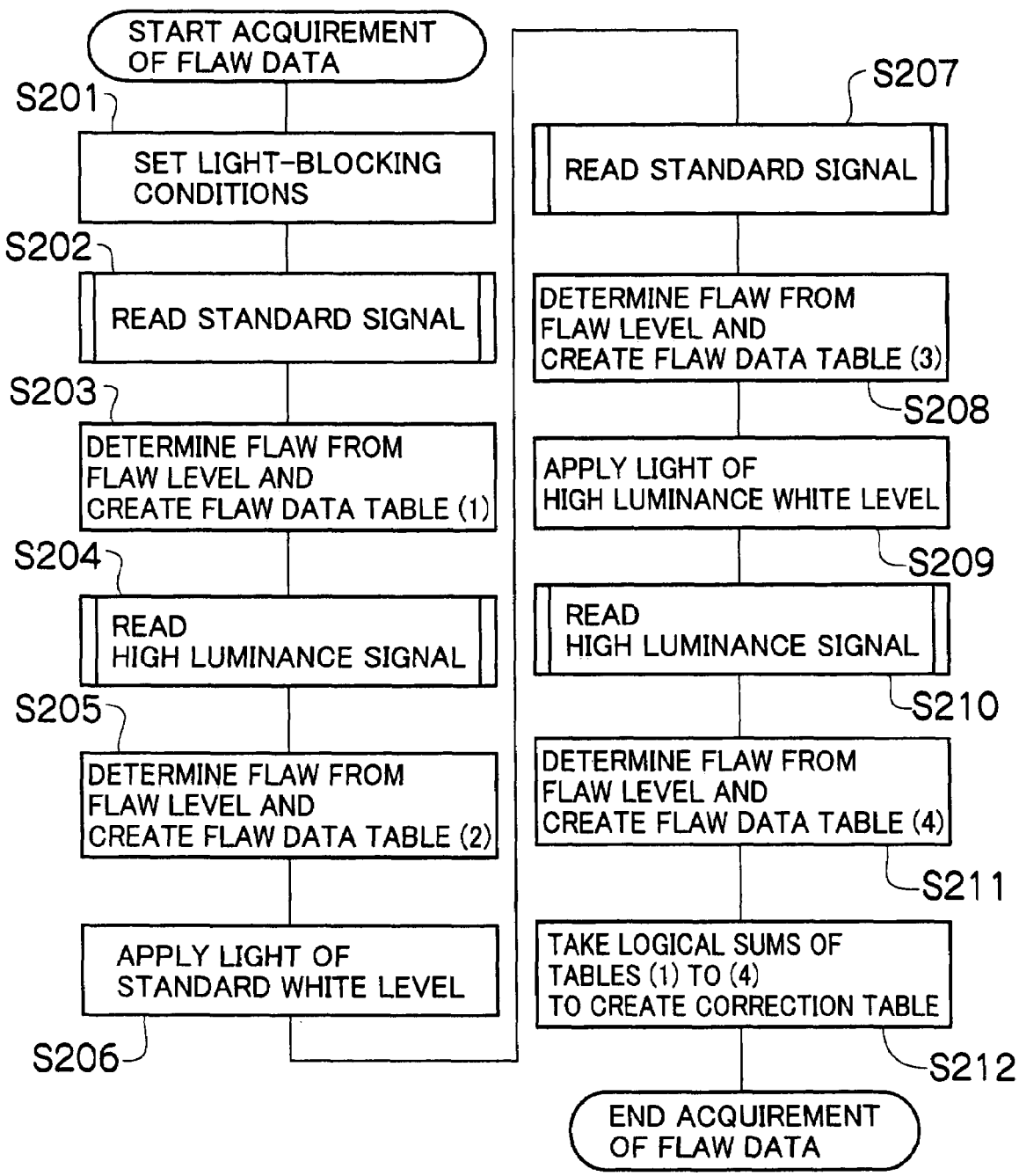
FIG. 16 is a flowchart showing a procedure for creating pixel information according to an embodiment of the present invention.

FIG. 16 is a flowchart showing a procedure for creating pixel information for correcting defective pixels of the imaging device.

First, light-blocking conditions, i.e., conditions with no light entering an imaging area of the imaging device are set (S201). Under the conditions, an output signal of the main pixel (hereinafter referred to as a standard signal) is read for each pixel (S202), and a flaw data table (1) indicating whether the pixel is flawed or not is created by comparison with previously measured flaw levels (S203). Subsequently, an output signal of the subsidiary pixel (hereinafter referred to as a high luminance signal) is read for each pixel (S204), and a flaw data table (2) indicating whether the pixel is flawed or not is created by comparison with previously measured flaw levels (S205).

Then, while the imaging area of the imaging device is irradiated with light of a standard white level (S206), a standard signal is read for each pixel (S207), and a flaw data table (3) indicating whether the pixel is flawed or not is created by comparison with previously measured flaw levels (S208).

Then, while the imaging area of the imaging device is irradiated with light of a high luminance white level (S209), a high luminance signal is read for each pixel (S210), and a flaw data table (4) indicating whether the pixel is flawed or not is created by comparison with previously measured flaw levels (S211).

Thereafter, logical sums of data tables (1) to (4) are computed, and a correction table (pixel information) for defining as a defective pixel a pixel with the result of the computation being equal to 1 is created (S212).

Figure 17:
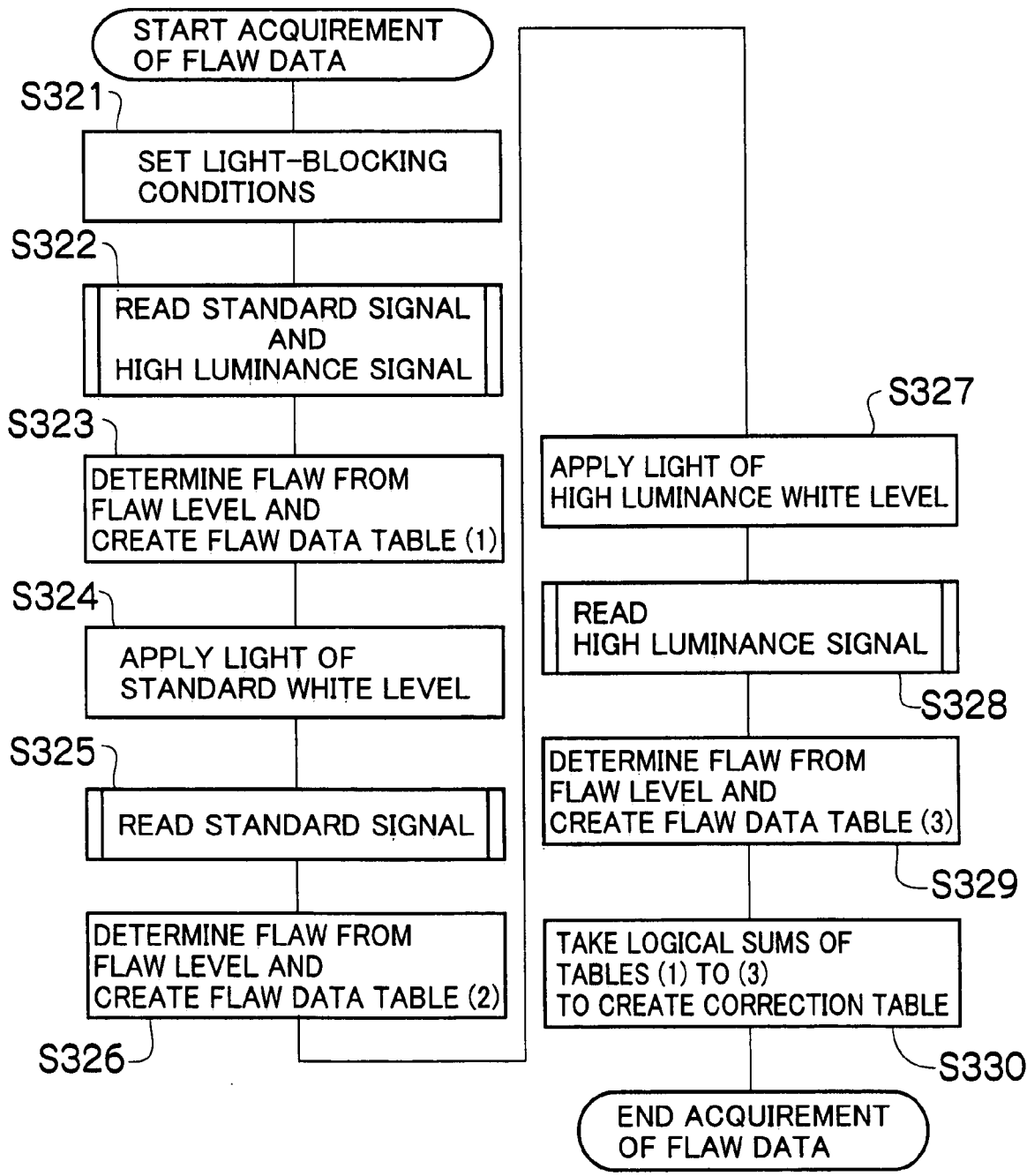
FIG. 17 is a flowchart showing another procedure for creating pixel information according to an embodiment of the present invention.

FIG. 17 is a flowchart showing another procedure for creating pixel information.

First, light-blocking conditions are set (S321). Under the conditions, a standard signal and a high luminance signal are mixed for each pixel and read (S322), and a flaw data table (1) indicating whether the pixel is flawed or not is created by comparison with previously measured flaw levels (S323).

Then, while the imaging area of the imaging device is irradiated with light of a standard white level (S324), a standard signal is read for each pixel (S325), and a flaw data table (2) indicating whether the pixel is flawed or not is created by comparison with previously measured flaw levels (S326).

Then, while the imaging area of the imaging device is irradiated with light of a high luminance white level (S327), a high luminance signal is read for each pixel (S328), and a flaw data table (3) indicating whether the pixel is flawed or not is created by comparison with previously measured flaw levels (S329).

Thereafter, logical sums of data tables (1) to (3) are computed, and a correction table (pixel information) for defining as a defective pixel a pixel with the result of the computation being equal to 1 is created (S330).

According to the procedure of FIG. 17, for signals in the light-blocking state resulting from crystal defects, standard signal and the high luminance signal are read at a time, thus making it possible to acquire defect data to create a correction table in shorter time compared to the case of FIG. 16.

Figure 18:
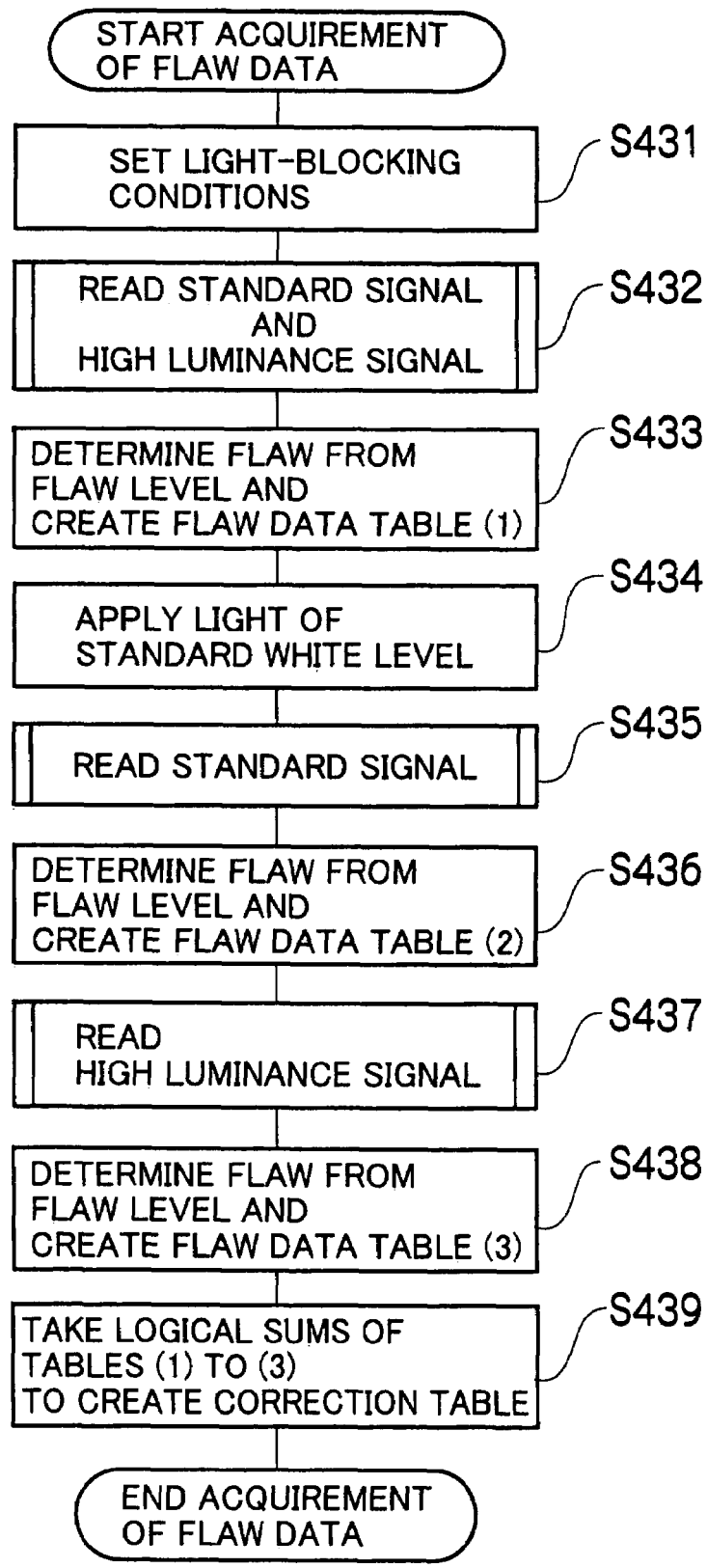
FIG. 18 is a flowchart showing still another procedure for creating pixel information according to an embodiment of the present invention.

FIG. 18 is a flowchart showing still another procedure for creating pixel information.

First, light-blocking conditions are set (S431). Under the conditions, a standard signal and a high luminance signal are mixed for each pixel and read (S432), and a flaw data table (1) indicating whether the pixel is flawed or not is created by comparison with previously measured flaw levels (S433).

Then, while the imaging area of the imaging device is irradiated with light of a standard white level (S434), a standard signal is read for each pixel (S435), and a flaw data table (2) indicating whether the pixel is flawed or not is created by comparison with previously measured flaw levels (S436). Subsequently, a high luminance signal is read for each pixel (S437), and a flaw data table (3) indicating whether the pixel is flawed or not is created by comparison with previously measured flaw levels (S438).

Thereafter, logical sums of data tables (1) to (3) are computed, and a correction table (pixel information) for defining as a defective pixel a pixel with the result of the computation being equal to 1 is created (S439).

Figure 19:
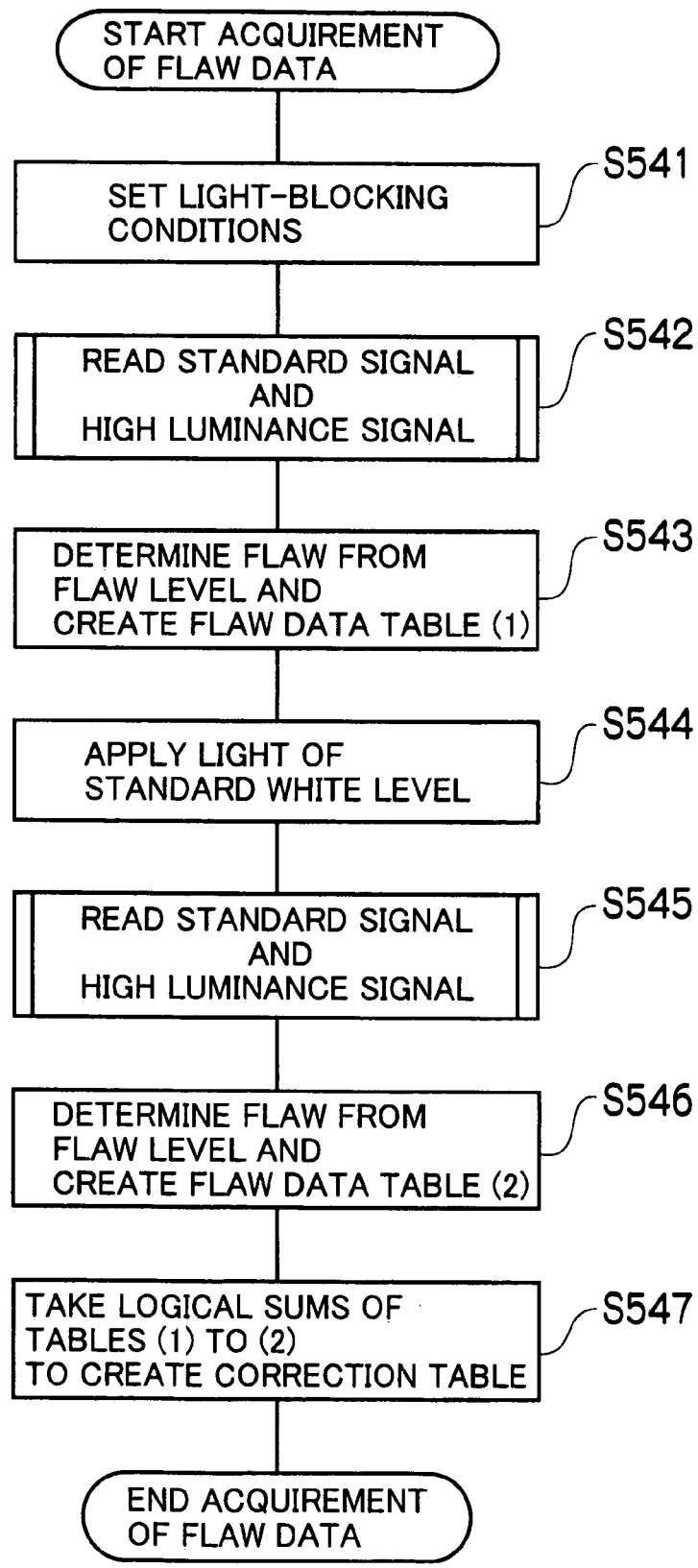
FIG. 19 is a flowchart showing still another procedure for creating pixel information according to an embodiment of the present invention.

FIG. 19 is a flowchart showing still another procedure for creating pixel information.

First, light-blocking conditions are set (S541). Under the conditions, a standard signal and a high luminance signal are mixed for each pixel and read (S542), and a flaw data table (1) indicating whether the pixel is flawed or not is created by comparison with previously measured flaw levels (S543).

Then, while the imaging area of the imaging device is irradiated with light of a standard white level (S544), a standard signal and a high luminance signal are read for each pixel (S545), and a flaw data table (2) indicating whether the pixel is flawed or not is created by comparison with previously measured flaw levels (S546).

Thereafter, logical sums of data tables (1) and (2) are computed, and a correction table (pixel information) for defining as a defective pixel a pixel with the result of the computation being equal to 1 is created (S547).

According to the procedures of FIGS. 18 and 19, defect data can be acquired to create a correction table in further shorter time compared to the case of FIG. 17.

FIG. 20 is a block diagram showing an example of the configuration of a digital camera according to an embodiment of the present invention. A digital camera 200 comprises an optical system 210, an imaging device 220, an analog signal processing unit 230, an A/D conversion unit 240, a digital signal processing unit 250, a buffer memory 260, a compression/expansion processing unit 270, a YC/RGB conversion unit 280, a media driver 290, an LCD driver 300, an LCD 310 for monitor, an operation unit 320, an EEPROM 330, a CPU 340 and the like.

The optical system 210 comprises a lens 211, an iris 212, a shutter 213 and the like, and forms a subject image on an imaging area PS of the imaging device 220. The shutter 213 is provided for preventing a situation in which light enters the imaging area PS to cause a smear when a signal is read from the imaging device 220, but it is not necessarily required depending on the configuration of the imaging device 220.

The imaging device 220 is a wide dynamic range imaging device shown in FIG. 5, and outputs to the analog signal processing unit 230 an image signal responsive to the amount of light entering the imaging area PS.

The analog signal processing unit 230 subjects an inputted image signal to predetermined analog signal processing such as noise reduction processing, white balance processing and γ processing, and outputs the processed signal to the A/D conversion unit 240. The A/D conversion unit 240 converts an inputted analog signal into a digital image signal and outputs the digital image signal to the digital signal processing unit 250.

The digital signal processing unit 250 subjects an output signal from the A/D conversion unit 240 to predetermined digital processing such as filter processing and defective pixel correction processing.

The output signal from the digital signal processing unit 250 is sent through the buffer memory 260 to the YC/RGB conversion unit 280, the compression/expansion processing unit 270, the LCD driver 300 and the like. The compression/expansion processing unit 270 compresses image data accumulated in the buffer memory 260 in a predetermined compression format such as the JPEG format and records the image data in a removable recording medium 291, or expands image data read from the removable recording medium 291. The YC/RGB conversion unit 280 converts uncompressed imaged data to be sent to the compression/expansion unit 270 into luminance data Y and color difference data Cr and Cb. When image data (captured image) recorded in the removable recording medium 291 is displayed on the LCD 310 for monitors, the YC/RGB conversion unit 280 converts a YC separation signal into a luminance signal and converts a color difference signal into an RGB signal. The LCD driver 300 drives the LCD 310 for monitors according to the RGB signal, whereby a color image is displayed on the LCD 310 for monitors.

For the removable recording medium 291, a small memory card having a flash memory, or the like, is used. Image data is written in/read from the removable recording medium 291 through the media driver 290.

The operation unit 320 is provided with various kinds of operation parts including a release button. The release button is an operation part for instructing the digital camera 200 to start image-capturing, and if the button is pressed in partway, focus control and iris control of the optical system 210 is performed, and at the time when the button is fully pressed, an image is captured, i.e., imaging signals are captured by the imaging device 220, the analog signal processing unit 230 and the A/D conversion unit 240. At this time, the optical system 210 is controlled by a photometry/distance measurement CPU (not shown), and the imaging device 220, the analog signal processing unit 230 and the A/D conversion unit 240 are controlled by an imaging system control circuit (not shown).

Programs and data for realizing various kinds of functions of the digital camera 200 are stored in the EEPROM 330. Data stored in the EEPROM 330 includes a correction table for the imaging device 220, created by any of procedures of FIGS. 16 to 19. The CPU 340 generally controls the digital camera 200 by executing the programs stored in the EEPROM 330.

In the digital camera 200, the digital signal processing unit 250 carries out defective pixel correction processing such as replacing a signal of a defective pixel of the imaging device 220 with a signal of a normal pixel with reference to the correction table stored in the EEPROM 330 when the imaging signal is processed. This enables even a flawed imaging device 220 to be used.

At this time, the output signal of the defective pixel can be corrected according to one correction table, thus making it possible to carry out correction efficiently using a small amount of information relative to the number of light-receiving elements of the imaging device 220. The capacity of the EEPROM 330 to record the correction table can be reduced.

Furthermore, although an imaging device having a honeycomb structure using a CCD is described as an example of a wide dynamic range imaging device in the above embodiment, the application range of the present invention is not limited thereto, and the present invention is effective for a complementary metal oxide semiconductor (CMOS) type imaging device and an imaging device having a matrix structure.

Furthermore, the order of reading the standard signal, the high luminance signal and the like in FIGS. 16 to 19 can be changed as appropriate. The order of setting conditions such as light-blocking, irradiation with standard white level light and irradiation with high luminance white level light can be changed as appropriate.

In the example described above, defective pixel correction processing is carried out by the digital signal processing unit 250, but this processing may be carried out by the CPU 340 as a matter of course.

Pixel information is not necessarily possessed as a table. That is, the data structure of pixel information may be an arrangement structure, a list structure or any other structure.

In the explanation described above, a CCD having a pixel arrangement of honeycomb structure is described as an example, but the application range of the present invention is not limited thereto, and an image sensor having a pixel arrangement such that all pixels are arranged in a square matrix form may be used.

A digital camera is described as an example in the embodiment described above, but the application range of the present invention is not limited thereto, and the present invention may be applied for other imaging apparatuses having electronic imaging functions, such as video cameras, DVD cameras, cellular phones with cameras, PDAs with cameras and mobile personal computers with cameras.

As described above, according to the present invention, in a solid-state image sensor comprising a main photosensitive pixel and a subsidiary photosensitive pixel capturing information in optically same phases, a defect of the subsidiary photosensitive pixel is corrected according to the pixel value of the main photosensitive pixel in a same pixel cell, thus making it possible to reduce a lowpass filter effect compared to conventional correction and maintain a resolution sensitivity after correction.

The digital camera of the present invention corrects an output signal of a defective pixel according to pixel information for defining as a defective pixel a pixel having a defect in at least one light-receiving element, thus making it possible to carry out correction efficiently using a small amount of information relative to the number of light-receiving elements.

According to the method for creating a correction table of the present invention, a correction table for defining as a defective pixel a pixel having a defect in at least one light-receiving element can be accurately created.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for correcting a defective pixel of a solid-state image sensor having a structure in which a large number of pixel cells each comprised of a combination of a main photosensitive pixel having high sensitivity and a subsidiary photosensitive pixel having low sensitivity are arranged according to a predetermined arrangement form, and a signal according to a signal charge photoelectrically converted with the main photosensitive pixel and a signal according to a signal charge photoelectrically converted with the subsidiary photosensitive pixel are selectively fetched, the method comprising the steps of:

if for any cell of the solid-state image sensor, the main photosensitive pixel constituting the pixel cell is a normal pixel, and the subsidiary photosensitive pixel is a defective pixel, then determining whether or not the level of a signal obtained from a main photosensitive pixel of a pixel cell existing around the pixel cell including the defective subsidiary photosensitive pixel is lower than a predetermined saturation level indicating a saturated output; and if the level of the signal obtained from the main photosensitive pixel of the pixel cell existing around the pixel cell including the defective pixel is lower than the saturation level, then correcting the pixel value of the defective subsidiary photosensitive pixel according to the pixel value of the main photosensitive pixel in the pixel cell identical to that of the defective photosensitive pixel.

2. The method as defined in claim 1, wherein for any pixel cell of the solid-state image sensor, if the main photosensitive pixel constituting the pixel cell is a defective pixel, then the pixel value of the defective main photosensitive pixel is corrected according to the pixel values of main photosensitive pixels of pixel cells existing around the pixel cell including the defective main photosensitive pixel.

3. The method as defined in claim 1, wherein for any pixel cell of the solid-state image sensor, if the main photosensitive pixel constituting the pixel cell is a defective pixel, and the subsidiary photosensitive pixel is a normal pixel, then the pixel value of the defective main photosensitive pixel is corrected according to the pixel value of the subsidiary photosensitive pixel in the pixel cell identical to that of the defective main photosensitive pixel if the level of the signal obtained from the main photosensitive pixel of the pixel cell existing around the pixel cell including the defective main photosensitive pixel exceeds a predetermined criterion.

4. The method as defined in claim 3, wherein the pixel value of the defective main photosensitive pixel is determined by performing computation of multiplying the pixel value of the subsidiary photosensitive pixel in the pixel cell identical to that of the defective main photosensitive pixel by a ratio of the sensitivity of the main photosensitive pixel to the sensitivity of the subsidiary photosensitive pixel.

5. The method as defined in claim 1, wherein the pixel value of the defective subsidiary photosensitive pixel is determined by performing computation of dividing the pixel value of the main photosensitive pixel in the pixel cell identical to that of the defective subsidiary photosensitive pixel by a ratio of the sensitivity of the main photosensitive pixel to the sensitivity of the subsidiary photosensitive pixel.

6. The method as defined in claim 5, wherein for any pixel cell of the solid-state image sensor, if the main photosensitive pixel constituting the pixel cell is a defective pixel, then the pixel value of the defective main photosensitive pixel is corrected according to the pixel values of main photosensitive pixels of pixel cells existing around the pixel cell including the defective main photosensitive pixel.

7. The method as defined in claim 5, wherein for any pixel cell of the solid-state image sensor, if the main photosensitive pixel constituting the pixel cell is a defective pixel, and the subsidiary photosensitive pixel is a normal pixel, then the pixel value of the defective main photosensitive pixel is corrected according to the pixel value of the subsidiary photosensitive pixel in the pixel cell identical to that of the defective main photosensitive pixel if the level of the signal obtained from the main photosensitive pixel of the pixel cell existing around the pixel cell including the defective main photosensitive pixel exceeds a predetermined criterion.

8. The method as defined in claim 7, wherein the pixel value of the defective main photosensitive pixel is determined by performing computation of multiplying the pixel value of the subsidiary photosensitive pixel in the pixel cell identical to that of the defective main photosensitive pixel by a ratio of the sensitivity of the main photosensitive pixel to the sensitivity of the subsidiary photosensitive pixel.

9. An imaging apparatus comprising:

a solid-state image sensor having a structure in which a large number of pixel cells each comprised of a combination of a main photosensitive pixel having high sensitivity and a subsidiary photosensitive pixel having low sensitivity are arranged according to a predetermined arrangement form, and a signal according to a signal charge photoelectrically converted with the main photosensitive pixel and a signal according to a signal charge photoelectrically converted with the subsidiary photosensitive pixel are selectively fetched;

a determination device which determines whether or not the level of a signal obtained from a main photosensitive pixel of a pixel cell existing around the pixel cell including the defective subsidiary photosensitive pixel is lower than a predetermined saturation level indicating a saturated output if the main photosensitive pixel constituting the pixel cell is a normal pixel and the subsidiary photosensitive pixel is a defective pixel for any pixel cell of the solid-state image sensor; and a defective pixel correcting device which corrects the pixel value of the defective subsidiary photosensitive pixel according to the pixel value of the main photosensitive pixel in the pixel cell identical to that of the defective subsidiary photosensitive pixel if it is determined by the determination device that the level of the signal obtained from the main photosensitive pixel of the pixel cell existing around the pixel cell including the defective pixel is lower than the saturation level.

10. The imaging apparatus as defined in claim 9, wherein color filters of same color components are placed for the main photosensitive pixel and the subsidiary photosensitive pixel in the same pixel cell, and one micro-lens is provided for one pixel cell above each pixel cell.

* * * * *